US012100341B2

(12) United States Patent
Kim et al.

(10) Patent No.: US 12,100,341 B2
(45) **Date of Patent: *Sep. 24, 2024**

(54) DISPLAY DEVICE

(71) Applicant: SAMSUNG DISPLAY CO., LTD., Yongin-si (KR)

(72) Inventors: Jung Taek Kim, Yongin-si (KR); Sang Su Han, Yongin-si (KR); Kyun Ho Kim, Yongin-si (KR); Hyung Keun Park, Yongin-si (KR); Joon Suk Baik, Yongin-si (KR); Se Keun Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/327,859

(22) Filed: Jun. 1, 2023

(65) Prior Publication Data

US 2023/0316994 A1 Oct. 5, 2023

Related U.S. Application Data

(63) Continuation of application No. 17/700,016, filed on Mar. 21, 2022, now Pat. No. 11,670,225, which is a (Continued)

(30) Foreign Application Priority Data

Feb. 28, 2020 (KR) ........................ 10-2020-0024900

(51) Int. Cl.
*G09G 3/32* (2016.01)
*G09G 3/20* (2006.01)
(Continued)

(52) U.S. Cl.
CPC ............. *G09G 3/32* (2013.01); *G09G 3/2092* (2013.01); *G09G 3/3233* (2013.01); *G09G 3/36* (2013.01);
(Continued)

(58) Field of Classification Search
CPC ........... G09G 3/3233; G09G 2310/062; G09G 2320/0261; G09G 2320/0295;
(Continued)

(56) References Cited

U.S. PATENT DOCUMENTS 6,819,311 B2 11/2004 Nose et al.
6,989,812 B2 1/2006 Arimoto et al.
(Continued)

FOREIGN PATENT DOCUMENTS

KR 10-2014-0013472 A 2/2014
KR 10-2018-0060530 A 6/2018
KR 10-2018-0127896 A 11/2018

OTHER PUBLICATIONS

Extended European Search Report dated May 31, 2021, issued in EP Application No. 21153327.8.

*Primary Examiner* — Michael J Jansen, II
(74) *Attorney, Agent, or Firm* — Lewis Roca Rothgerber Christie LLP

(57) ABSTRACT

A display device includes: a plurality of pixel blocks each including a plurality of pixels; a scan driver supplying a scan signal to the scan lines and to supply a control signal to the control lines; a data driver supplying an image data voltage or a low grayscale data voltage to the data lines; and a power supply supplying a reference voltage to the pixels, wherein the pixels are configured to receive the image data voltage during a first scan period of a frame, and to receive the low grayscale data voltage during a second scan period of the frame, and the reference voltage supplied to a first pixel row
(Continued)

of at least one of the pixel blocks in the first scan period is different from the reference voltage supplied to a last pixel row of at least one of the pixel blocks in the first scan period.

7 Claims, 20 Drawing Sheets

Related U.S. Application Data continuation of application No. 17/037,089, filed on Sep. 29, 2020, now Pat. No. 11,282,441.

(51) Int. Cl.
*G09G 3/3233* (2016.01)
*G09G 3/36* (2006.01)

(52) U.S. Cl.
CPC ... *G09G 3/3648* (2013.01); *G09G 2310/0205* (2013.01); *G09G 2310/027* (2013.01); *G09G 2310/0278* (2013.01); *G09G 2310/061* (2013.01); *G09G 2310/062* (2013.01); *G09G 2320/0252* (2013.01); *G09G 2320/0257* (2013.01); *G09G 2320/0261* (2013.01); *G09G 2320/0295* (2013.01); *G09G 2320/043* (2013.01); *G09G 2320/0673* (2013.01); *G09G 2330/021* (2013.01)

(58) Field of Classification Search
CPC ..... G09G 2320/0673; G09G 2330/021; G09G 3/2081; G09G 2310/0218; G09G 2310/0259; G09G 2310/066; G09G 2320/0233
See application file for complete search history.

(56) References Cited

U.S. PATENT DOCUMENTS

| | | | | |
|---|---|---|---|---|
| 7,098,934 | B2 | 8/2006 | Arimoto et al. | |
| 7,106,284 | B2 | 9/2006 | Ohta et al. | |
| 7,106,350 | B2 | 9/2006 | Baba et al. | |
| 7,218,305 | B2 | 5/2007 | Nose | |
| 7,256,763 | B2 | 8/2007 | Kaneki et al. | |
| 7,450,101 | B2 | 11/2008 | Arimoto et al. | |
| 7,619,605 | B2 | 11/2009 | Shin et al. | |
| 7,907,137 | B2 | 3/2011 | Shirasaki et al. | |
| 7,990,358 | B2 | 8/2011 | Ishihara | |
| 8,339,338 | B2 | 12/2012 | Nakamura | |
| 9,088,788 | B2 | 7/2015 | Shin et al. | |
| 9,418,580 | B2 | 8/2016 | Kim et al. | |
| 9,892,678 | B2 | 2/2018 | Song et al. | |
| 9,990,888 | B2 | 6/2018 | Oh et al. | |
| 10,311,788 | B2 | 6/2019 | Lim et al. | |
| 10,586,490 | B2 * | 3/2020 | Soda | G09G 3/3258 |
| 10,643,537 | B2 * | 5/2020 | Kwon | H10K 59/35 |
| 10,825,388 | B2 | 11/2020 | Tomitani | |
| 10,908,719 | B2 * | 2/2021 | Jun | G06F 3/0443 |
| 10,957,249 | B2 | 3/2021 | Lee | |
| 11,081,054 | B2 | 8/2021 | Kim et al. | |
| 11,107,404 | B2 | 8/2021 | Park | |
| 11,222,588 | B2 * | 1/2022 | Tomitani | G09G 3/3233 |
| 11,282,441 | B2 * | 3/2022 | Kim | G09G 3/36 |
| 11,436,982 | B2 | 9/2022 | Kang et al. | |
| 11,574,594 | B2 * | 2/2023 | Ka | G09G 3/3258 |
| 11,670,225 | B2 * | 6/2023 | Kim | G09G 3/2092 345/204 |
| 2001/0003448 | A1 | 6/2001 | Nose et al. | |
| 2002/0003522 | A1 | 1/2002 | Baba et al. | |
| 2003/0001983 | A1 | 1/2003 | Nose | |
| 2003/0090449 | A1 | 5/2003 | Arimoto et al. | |
| 2004/0150605 | A1 | 8/2004 | Arimoto et al. | |
| 2004/0252097 | A1 | 12/2004 | Kaneki et al. | |
| 2005/0024316 | A1 | 2/2005 | Ohta et al. | |
| 2006/0077157 | A1 | 4/2006 | Arimoto et al. | |
| 2006/0221015 | A1 | 10/2006 | Shirasaki et al. | |
| 2006/0279517 | A1 | 12/2006 | Shin et al. | |
| 2008/0170026 | A1 | 7/2008 | Ishihara | |
| 2008/0180385 | A1 | 7/2008 | Yoshida et al. | |
| 2011/0234911 | A1 | 9/2011 | Nakamura | |
| 2013/0271504 | A1 | 10/2013 | Kim et al. | |
| 2014/0021870 | A1 * | 1/2014 | An | G09G 3/3233 315/161 |
| 2016/0171930 | A1 | 6/2016 | Song et al. | |
| 2017/0132979 | A1 | 5/2017 | Oh et al. | |
| 2018/0174514 | A1 | 6/2018 | Lee | |
| 2018/0190196 | A1 * | 7/2018 | Kwon | H10K 59/30 |
| 2018/0342203 | A1 * | 11/2018 | Soda | G09G 3/3258 |
| 2019/0164485 | A1 | 5/2019 | Tomitani | |
| 2019/0189060 | A1 | 6/2019 | Takasugi | |
| 2019/0204944 | A1 * | 7/2019 | Jun | G06F 3/0412 |
| 2019/0371236 | A1 | 12/2019 | Sakai | |
| 2020/0043420 | A1 | 2/2020 | Kang et al. | |
| 2020/0152128 | A1 | 5/2020 | Kim et al. | |
| 2020/0160781 | A1 | 5/2020 | Park | |
| 2021/0012714 | A1 * | 1/2021 | Tomitani | G09G 3/3233 |
| 2021/0264848 | A1 * | 8/2021 | Yamashita | G09G 3/2011 |
| 2021/0272505 | A1 * | 9/2021 | Kim | G09G 3/36 |
| 2022/0044634 | A1 * | 2/2022 | Ka | G09G 3/3258 |
| 2022/0208085 | A1 * | 6/2022 | Kim | G09G 3/3233 |

* cited by examiner

DISPLAY DEVICE

CROSS-REFERENCE TO RELATED APPLICATIONS

This application is a continuation of U.S. patent application Ser. No. 17/700,016, filed Mar. 21, 2022, which is a continuation of U.S. patent application Ser. No. 17/037,089, filed Sep. 29, 2020, now U.S. Pat. No. 11,282,441, which claims priority to and the benefit of Korean Patent Application No. 10-2020-0024900, filed Feb. 28, 2020, the entire content of all of which is incorporated herein by reference.

BACKGROUND

1. Field

Aspects of some example embodiments of the present invention relate to a display device.

2. Description of the Related Art

A display device may perform a driving operation to compensate for degradation or changes in characteristics of a driving transistor outside the pixel circuit by sensing a threshold voltage or mobility of the driving transistor included in a pixel circuit.

On the other hand, as display resolution and driving frequency increases, the inconvenience of viewing a video, such as motion blur (i.e., motion drag) being recognized, may be caused when displaying a video. In order to improve or mitigate the motion blur phenomenon, a technique of inserting a black image between frames may be utilized.

The above information disclosed in this Background section is only for enhancement of understanding of the background and therefore the information discussed in this Background section does not necessarily constitute prior art.

SUMMARY

Aspects of some example embodiments of the present invention include a display device that supplies a reference voltage supplied to a pixel differently according to a pixel row in unit of a pixel block.

Aspects of some example embodiments of the present invention include a display device that supplies an image data voltage of the same grayscale differently according to a pixel row in unit of a pixel block unit.

However, the characteristics of embodiments according to the present invention are not limited to characteristics described above, but may be variously extended in a range that does not depart from the spirit and scope of the present invention.

A display device according to some example embodiments of the present invention includes pixel blocks each including pixels connected to scan lines, control lines, and data lines; a scan driver that supplies a scan signal to the scan lines and supplies a control signal to the control lines; a data driver that supplies an image data voltage or a low grayscale data voltage to the data lines; and a power supply that supplies a reference voltage to the pixels. The pixels may receive the image data voltage during a first scan period of a frame, and receive the low grayscale data voltage during a second scan period of the frame. The reference voltage supplied to a first pixel row of at least one of the pixel blocks in the first scan period is different from the reference voltage supplied to a last pixel row of at least one of the pixel blocks in the first scan period.

According to some example embodiments of the present invention, the reference voltage supplied to the first pixel row in the first scan period is greater than the reference voltage supplied to the last pixel row in the first scan period. The low grayscale data voltage may be an image data voltage corresponding to a black grayscale.

According to some example embodiments of the present invention, the first scan period with respect to pixel rows included in a first pixel block of the pixel blocks may be sequentially activated during a first period, and the second scan period with respect to the pixel rows included in the first pixel block may be simultaneously activated at the same time.

According to some example embodiments of the present invention, the power supply may gradually decrease the reference voltage during the first period.

According to some example embodiments of the present invention, the power supply may repeat a change of the reference voltage of the first period for each of the pixel blocks.

According to some example embodiments of the present invention, each of the pixel blocks may include consecutive k pixel rows (k is an integer greater than one).

According to some example embodiments of the present invention, the display device may further include first to k-th power lines that are respectively connected to first to k-th pixel rows of each of the pixel blocks and transfers the reference voltage of different voltage levels from the power supply.

According to some example embodiments of the present invention, a j-th power line may be connected to the j-th pixel rows of the pixel blocks (j is an integer greater than or equal to 1 and less than or equal to k).

According to some example embodiments of the present invention, the scan driver may sequentially supply the scan signal to scan lines included in a p-th pixel block (p is a positive integer) among the scan lines, and may simultaneously supply the scan signal to scan lines included in q-th pixel blocks (q is a positive integer) among the scan lines.

According to some example embodiments of the present invention, each of the pixels may include a light emitting element; a first transistor connected between a first driving power supply and the light emitting element, and having a gate electrode connected to a first node; a second transistor connected between one of the data lines and the first node, and having a gate electrode receiving the scan signal; a third transistor that supplies the reference voltage to a second node to which the first transistor and the light emitting element are connected in response to the control signal supplied to a gate electrode; and a storage capacitor connected between the first node and the light emitting element.

According to some example embodiments of the present invention, the second transistor and the third transistor may be turned on during the first scan period, and the third transistor may be turned on during the second scan period.

According to some example embodiments of the present invention, the data driver may supply a first image data voltage corresponding to a first grayscale to the first pixel row of each of the pixel blocks and the last pixel row of each of the pixel blocks at different voltage levels.

According to some example embodiments of the present invention, the first image data voltage supplied to the first pixel row of each of the pixel blocks may be less than the first image data voltage supplied to the last pixel row of each of the pixel blocks.

According to some example embodiments of the present invention, the data driver may gradually increase the first image data voltage from the first pixel row of each of the pixel blocks to the last pixel row of each of the pixel blocks.

According to some example embodiments of the present invention, the display device may further include a gamma tap voltage generator that controls gamma tap voltages output in pixel rows of each of the pixel blocks; and a gamma voltage generator that generates gamma voltages corresponding to the pixel rows based on the gamma tap voltages.

A display device according to some example embodiments of the present invention includes pixel blocks each including pixels connected to scan lines, control lines, data lines, and sensing lines; a scan driver that supplies a scan signal to the scan lines and supplies a control signal to the control lines; a data driver that supplies an image data voltage or a low grayscale data voltage to the data lines; and a power supply that supplies a reference voltage to the pixels through the sensing lines. Each of the pixels may receive the image data voltage during a first scan period of one frame, and receive the low grayscale data voltage during a second scan period of the one frame. An image data voltage supplied to a first pixel row of at least one of the pixel blocks less than an image data voltage supplied to a last pixel row of at least one of the pixel blocks. Both the image data voltage supplied to the first pixel row and the image data voltage supplied to the last pixel row correspond to a first grayscale.

According to some example embodiments of the present invention, the data driver gradually may increase the image data voltage of the first grayscale from the first pixel row of each of the pixel blocks to the last pixel row of each of the pixel blocks. The low grayscale data voltage may be an image data voltage corresponding to a black grayscale.

According to some example embodiments of the present invention, the display device may further include a gamma tap voltage generator that decreases gamma tap voltages as pixel rows included in each of the pixel blocks are sequentially selected; and a gamma voltage generator that generates gamma voltages corresponding to the pixel rows based on the gamma tap voltages.

According to some example embodiments of the present invention, the power supply may decrease the reference voltage as pixel rows included in each of the pixel blocks are sequentially selected.

According to some example embodiments of the present invention, a light emitting time of the first pixel row of each of the pixel blocks may be longer than a light emitting time of the last pixel row of each of the pixel blocks.

BRIEF DESCRIPTION

DETAILED DESCRIPTION

Figure 1:
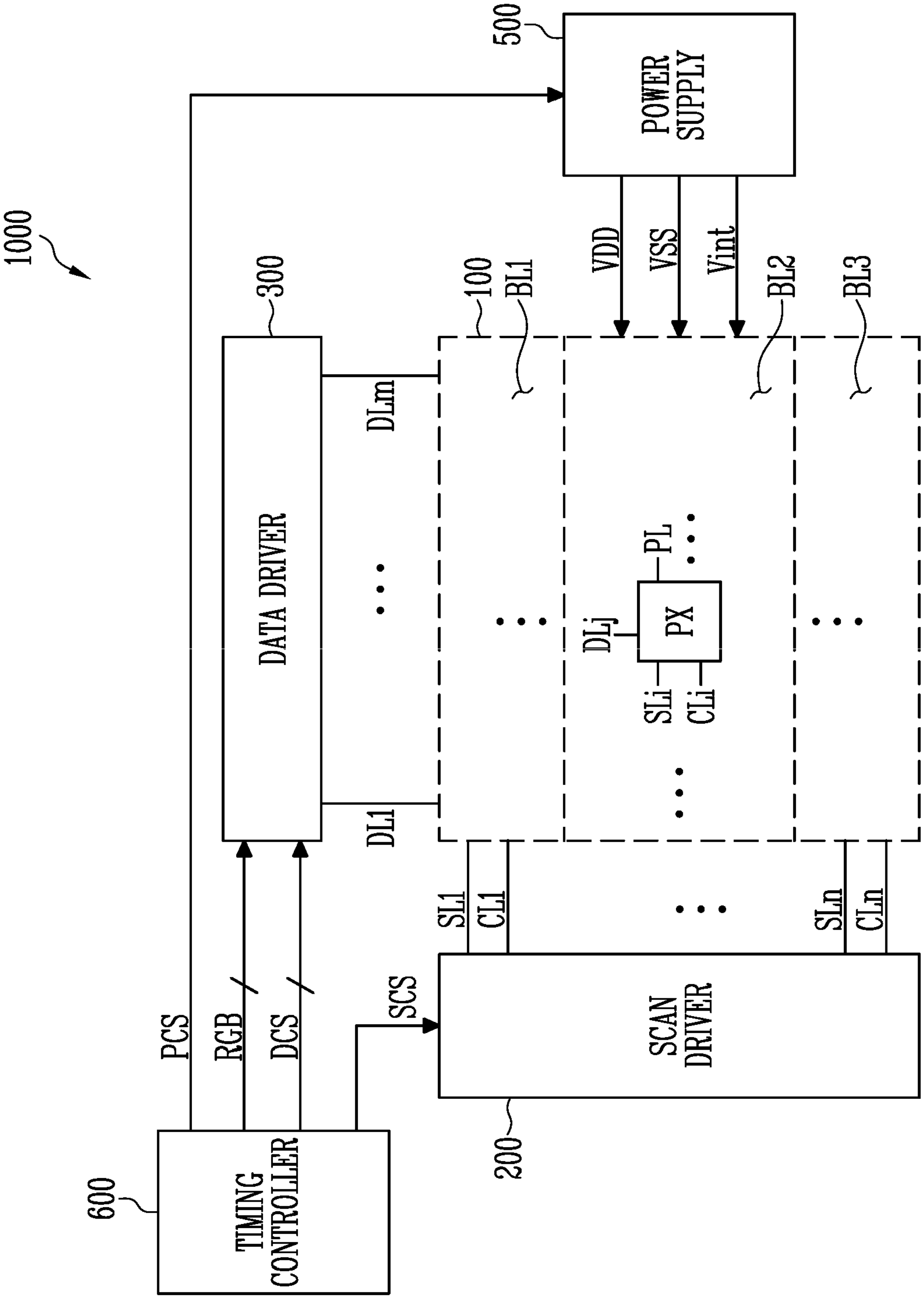
FIG. 1 is a block diagram showing a display device according to some example embodiments of the present invention.

Hereinafter, with reference to accompanying drawings, aspects of some example embodiments of the present invention will be described in more detail. The same reference numerals are used for the same constituent elements on the drawing and duplicate descriptions for the same constituent elements are omitted.

FIG. 1 is a block diagram showing a display device according to some example embodiments of the present invention.

Referring to FIG. 1, a display device 1000 may include a pixel unit 100, a scan driver 200, a data driver 300, a power supply 500, and a timing controller 600.

The display device 1000 may be a flat panel display device, a flexible display device, a curved display device, a foldable display device, a bendable display device, or a stretchable display device. In addition, the display device may be applied to a transparent display device, a head-mounted display device, a wearable display device, and the like. In addition, the display device 1000 may be applied to various electronic devices such as a smart phone, a tablet, a smart pad, a TV, a monitor, and the like.

Meanwhile, the display device 1000 may be implemented as an organic light emitting diode display device, a liquid crystal display device, and the like. However, this is merely an example, and the configuration of the display device 1000 is not limited thereto. For example, the display device 1000 may be a self-luminous display device including an inorganic light emitting element.

According to some example embodiments, the display device 1000 may be driven by being divided into a display period for displaying an image and a sensing period for sensing a characteristic of a driving transistor and/or a light emitting element included in each of pixels PX. Because a main feature of the present invention is the driving and operation during the display period, this will be mainly described.

According to some example embodiments, the display device 1000 may further include a sensing circuit (e.g., 400 in FIG. 20) for calculating the characteristic from pixels PX and generating s compensation value thereof. For example, the configuration or function of at least portion of the sensing circuit can be integrated into the data driver 300.

The pixel unit 100 may include pixels PX disposed to be connected to data lines DL1 to DLm (here, m is a natural number), scan lines SL1 to SLn (here, n is a natural number), and a power line PL (e.g., a reference power line or an initialization power line).

According to some example embodiments, each of the pixels PX may be further connected to a sensing line for extracting a sensing value. The sensing line may be electrically connected to the pixel PX by alternating with the power line PL by switching operation (see FIGS. 20 and 21).

The pixels PX may receive voltages of the first driving power supply VDD and the second driving power supply VSS from an external source.

Meanwhile, FIG. 1 shows n scan lines SL1 to SLn are shown, but embodiments according to the present invention are not limited thereto. For example, at least one control line, scan line, sensing line, and the like may be additionally formed in the pixel unit 100 corresponding to a circuit structure of the pixel PX.

According to some example embodiments, transistors included in the pixel PX may be an N-type oxide thin film transistor. For example, the oxide thin film transistor may be a low temperature polycrystalline oxide (LTPO) thin film transistor. However, this is merely an example, and N-type transistors are not limited thereto. For example, an active pattern (e.g., semiconductor layer) included in transistors may include an inorganic semiconductor (e.g., amorphous silicon, poly silicon) or an organic semiconductor. In addition, at least one of transistors included in the display device 1000 may be replaced with a P-type transistor.

According to some example embodiments, the pixel unit 100 may include a plurality of pixel blocks BL1, BL2, and BL3. Each of the pixel blocks BL1, BL2, and BL3 may include a set or predetermined number of pixel rows. For example, each of the pixel blocks BL1, BL2, and BL3 may include eight pixel rows, according to some example embodiments. However, this is merely, and the number of pixel rows included in each of the pixel blocks BL1, BL2, and BL3 is not limited thereto. For example, the number of pixel rows included in each of the pixel blocks may be more than eight or less than eight according to some example embodiments.

Meanwhile, black image insertion driving may be performed in units of pixel blocks BL1, BL2, and BL3. According to some example embodiments, a black data voltage may be simultaneously supplied to the pixel rows included in each of the pixel blocks BL1, BL2, and BL3, and then a black image may be displayed in a corresponding pixel block during a period (e.g., a set or predetermined period).

The timing controller 600 may generate a data driving control signal DCS, a scan driving control signal SCS, and a power driving control signal PCS in response to synchronous signals supplied from the external. The data driving control signal DCS generated by the timing controller 600 may be supplied to the data driver 300, the scan driving control signal SCS may be supplied to the scan driver 200, and the power driving control signal PCS may be supplied to the power supply 500.

In addition, the timing controller 600 may supply an image data RGB in which input image data supplied from the external is rearranged to the data driver 300.

The data driving control signal DCS may include a source start signal, and clock signals. The source start signal may control a sampling start point of data. The clock signals may be used to control the sampling operation.

The scan driving control signal SCS may include a scan start signal, a control start signal, and clock signals. The scan start signal may control the timing of a scan signal. The control start signal may control a timing of a control signal. The clock signals may be used to shift the scan start signal and/or control start signal.

The power driving control signal PCS may control a voltage level or a supply point of a reference voltage Vint (or, initialization voltage).

According to some example embodiments, the timing controller 600 may detect a change in characteristic of the driving transistor based on current or voltage extracted from the pixel PX during the sensing period. The timing controller 600 may calculate a compensation value that compensates for input image data based on the detected change in the characteristic. In addition, the timing controller 600 may compensate for image data RGB based on the compensation value.

The scan driver 200 may receive the scan driving control signal SCS from the timing controller 600. The scan driver 200 receiving the scan driving control signal SCS may supply a scan signal to the scan lines SL1 to SLn and a control signal to the control lines CL1 to CLn.

For example, the scan driver 200 may sequentially supply the scan signal to the scan lines SL1 to SLn. When the scan signal is sequentially supplied to the scan lines SL1 to SLn, the pixels PX may be selected in unit of horizontal line. For this purpose, the scan signal may be set to a gate-on voltage (e.g., logic high level) so that the transistor included in the pixels PX may be turned on.

Similarly, the scan driver 200 may supply the control signal to the control lines CL1 to CLn. The control signal may be used to sense (or extract) a driving current (i.e., current flowing through the driving transistor) flowing through the pixel. A timing and waveform, at which the scan signal and the control signal are supplied, may be set differently according to the display period and the sensing period.

Meanwhile, in FIG. 1, one scan driver 200 is shown to output both the scan signal and the control signal, but the embodiments according to the present invention are not limited thereto. For example, the scan driver 200 may include a first scan driver that supplies the scan signal to the pixel unit 100, and a second scan driver that supplies the control signal to the pixel unit 100. That is, the first and second scan drivers may be implemented in separate configurations.

The data driver 300 may receive the data driving control signal DCS from the timing controller 600. The data driver 300 may supply the image data voltage to the pixel unit 100 during the first scan period of each of pixels of one frame period. In addition, the data driver 300 may supply the black data voltage to the pixel unit 100 during the second scan period of one frame period. At this time, the image data voltage may be a data voltage for displaying an effective image, that is, a data voltage corresponding to the image data RGB, and the black data voltage may be a data voltage corresponding to a black grayscale.

As described above, according to some example embodiments, the data driver 300 may function as the sensing circuit. For example, the current or voltage extracted from the pixel PX during the sensing period may be supplied to the data driver 300 through a data line (of at least one corresponding to a corresponding pixel of data lines DL1 to DLm). The sensing circuit included in the data driver 300 may calculate a sensing value based on the extracted current/voltage. That is, the function of the sensing lines SSL1 to SSLm of FIG. 20 may be performed through the data lines DL1 to DLm.

The power supply 500 may supply the reference voltage Vint to pixels PX through the power line PL based on the power driving control signal PCS. According to some example embodiments, the power line PL may be commonly connected to all the pixels PX. For example, the power line PL may be patterned within the display panel while overlapping with the pixel unit 100.

According to some example embodiments, during a period in which the scan signal is sequentially supplied to the first pixel block BL1, the power supply 500 may gradually decrease the reference voltage Vint. Similarly, for each of the other pixel blocks BL2 and BL3, during a period in which the scan signal is sequentially supplied, the power supply 500 may gradually decrease the reference voltage Vint.

Figure 2:
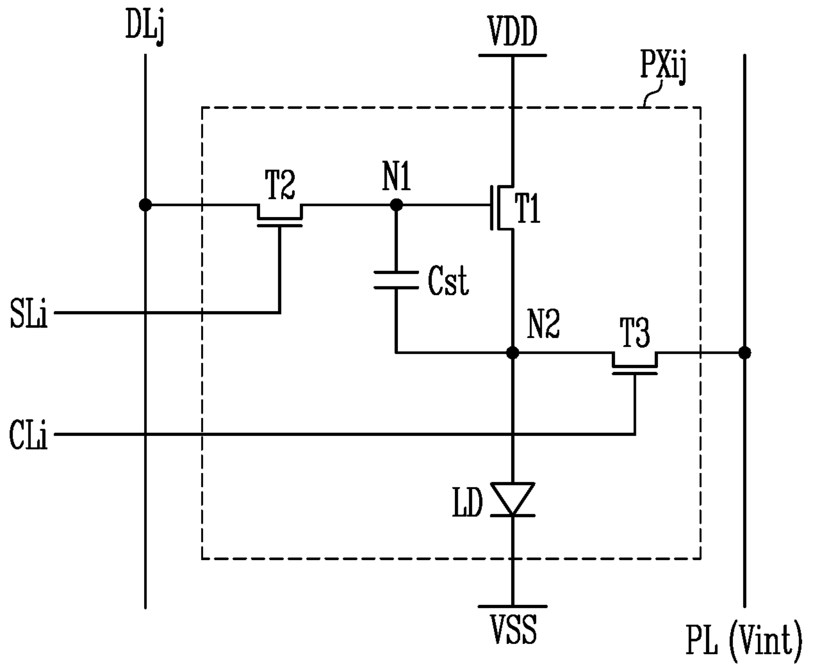
FIG. 2 is a circuit diagram showing an example of a pixel included in a display device of FIG. 1.
Figure 3:
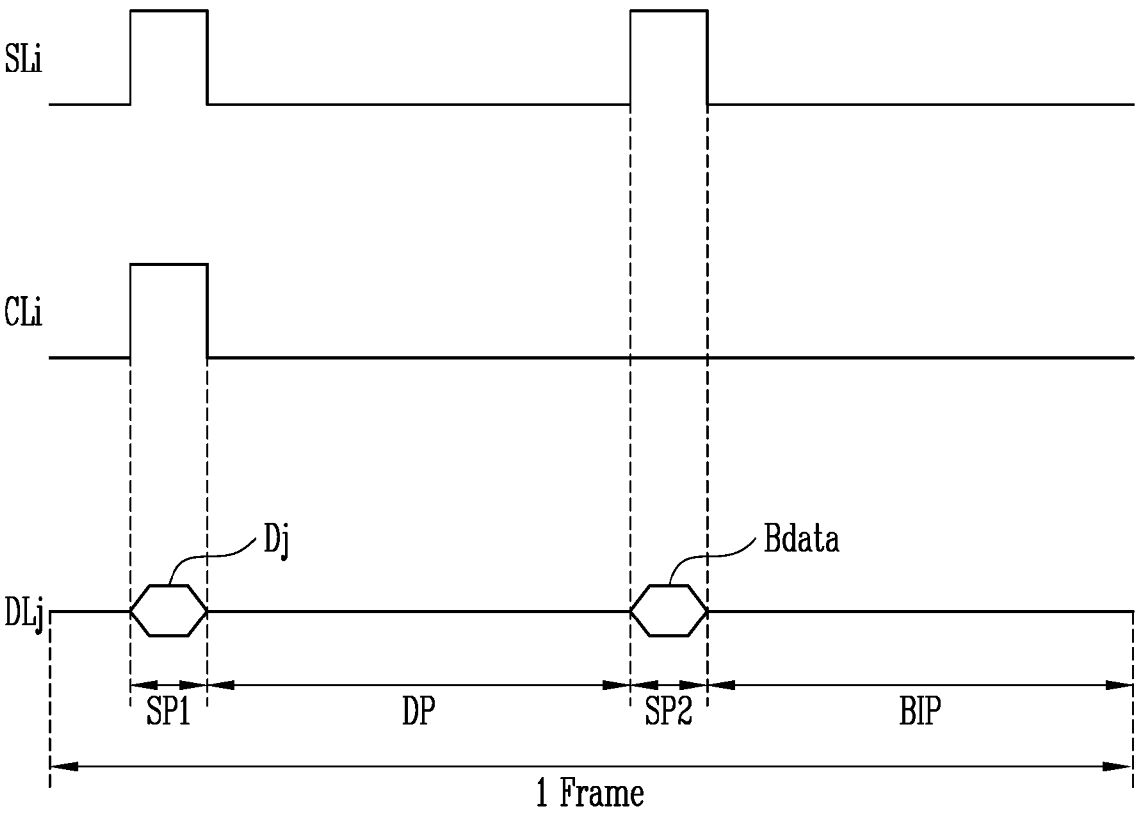
FIG. 3 is a waveform diagram showing an example of an operation of a pixel of FIG. 2.

FIG. 2 is a circuit diagram showing an example of a pixel included in a display device of FIG. 1, and FIG. 3 is a waveform diagram showing an example of an operation of a pixel of FIG. 2.

In FIGS. 2 and 3, for better comprehension and ease of description, a pixel PXij disposed on the i-th horizontal line and connected to the j-th data line DLj will be shown.

Referring to FIGS. 2 and 3, the pixel PXij may include a light emitting element LD, a first transistor T1 (or driving transistor), a second transistor T2, a third transistor T3, and a storage capacitor Cst.

The first electrode (anode or cathode) of the light emitting element LD is connected to the second node N2, and the second electrode (cathode or anode) is connected to the second driving power supply VSS. The light emitting element LD generates light of a set or predetermined luminance in response to an amount of current supplied from the first transistor T1 (e.g., a driving transistor).

The first electrode of the first transistor T1 may be connected to the first driving power supply VDD, and the second electrode thereof may be connected to the first electrode of the light emitting element LD. A gate electrode of the first transistor T1 may be connected to the first node N1. The first transistor T1 controls an amount of current flowing to the light emitting element LD in response to the voltage of the first node N1.

The first electrode of the second transistor T2 may be connected to the data line DLj, and the second electrode may be connected to the first node N1. A gate electrode of the second transistor T2 may be connected to the scan line SLi. The second transistor T2 may be turned on when the scan signal is supplied to the scan line SLi to transfer the data voltage from the data line DLj to the first node N1.

The third transistor T3 may be connected between the power line PL and the second electrode (i.e., second node N2) of the first transistor T1. A gate electrode of the third transistor T3 may be connected to a control line CLi. The third transistor T3 may be turned on when a control signal is supplied to the control line CLi to electrically connect the power line PL and the second node N2, (i.e., second electrode of the first transistor T1).

According to some example embodiments, when the third transistor T3 is turned on, the reference voltage Vint may be supplied to the second node N2 through the power line PL. The reference voltage Vint may serve to set to a predetermined value or initialize the voltage of the second electrode (e.g., source electrode) of the first transistor T1. Accordingly, reliability of the driving current generated from the first transistor T1 may be improved.

According to some example embodiments, when the third transistor T3 is turned on, the current generated in the first transistor T1 may be supplied to a sensing circuit or a timing controller 600 (see FIG. 1) through a sensing line (not shown).

According to some example embodiments, when the second transistor T2 is turned on, the current generated in the first transistor T1 may be supplied to the sensing circuit or the timing controller 600 (see FIG. 1) through the data line DLj.

The storage capacitor Cst may be connected between the first node N1 and the second node N2. The storage capacitor Cst may store a voltage corresponding to a voltage difference between the first node N1 and the second node N2.

On the other hand, the circuit structure of the pixel PXij according to some example embodiments of the present invention is not limited to FIG. 2. For example, the light emitting element LD may be disposed between the first driving power supply VDD and the first electrode of the first transistor T1. In addition, in FIG. 2, the transistors T1 to T3 are shown as an NMOS, but embodiments according to the present invention are not limited thereto. For example, at least one of the transistors T1 to T3 may be formed of a PMOS.

As shown in FIG. 3, one frame 1 Frame for each pixel PXij may include a first scan period SP1, a display period DP, a second scan period SP2, and a black insertion period BIP.

During the first scan period SP1, the scan signal and the control signal may be supplied to the scan lines SLi and the control line CLi, respectively. In addition, an image data voltage Dj may be supplied as the data line DLj during the first scan period SP1. Then, the second transistor T2 may be turned on to supply the image data voltage Dj to the first node N1, and the third transistor T3 may be turned on to supply the reference voltage Vint to the second node N2.

Accordingly, a voltage amount corresponding to the difference between the image data voltage Dj and the reference voltage Vint may be stored in the storage capacitor Cst.

Next, the second and third transistors T2 and T3 may be turned off during the display period DP. The light emitting element LD may emit light with luminance corresponding to the voltage stored in the storage capacitor Cst. An effective image to be substantially displayed may be displayed during the display period DP.

Next, the scan signal may be supplied to the scan line SLi during the second scan period SP2. In addition, a black data voltage Bdata may be supplied to the data line DLj during the second scan period SP2. Then, the second transistor T2 may be turned on to supply the black data voltage Bdata to the first node N1.

Next, the second transistor T2 may be turned off during the black insertion period BIP, and the light emitting element LD may display a black image. When a pixel PXij displays a video, a response time of the pixel may be increased due to a sudden change in the data voltage. Due to an increase of the response time, a motion blur may be visually recognized by the user, and the motion blur of the video may be improved by inserting the black image during a short black insertion period BIP between display images between frames.

During a frame 1Frame, a length of the display period DP and a length of the black insertion period BIP may be determined as an optimal value by a factor such as an image change speed, a frequency, and the like.

Figure 4:
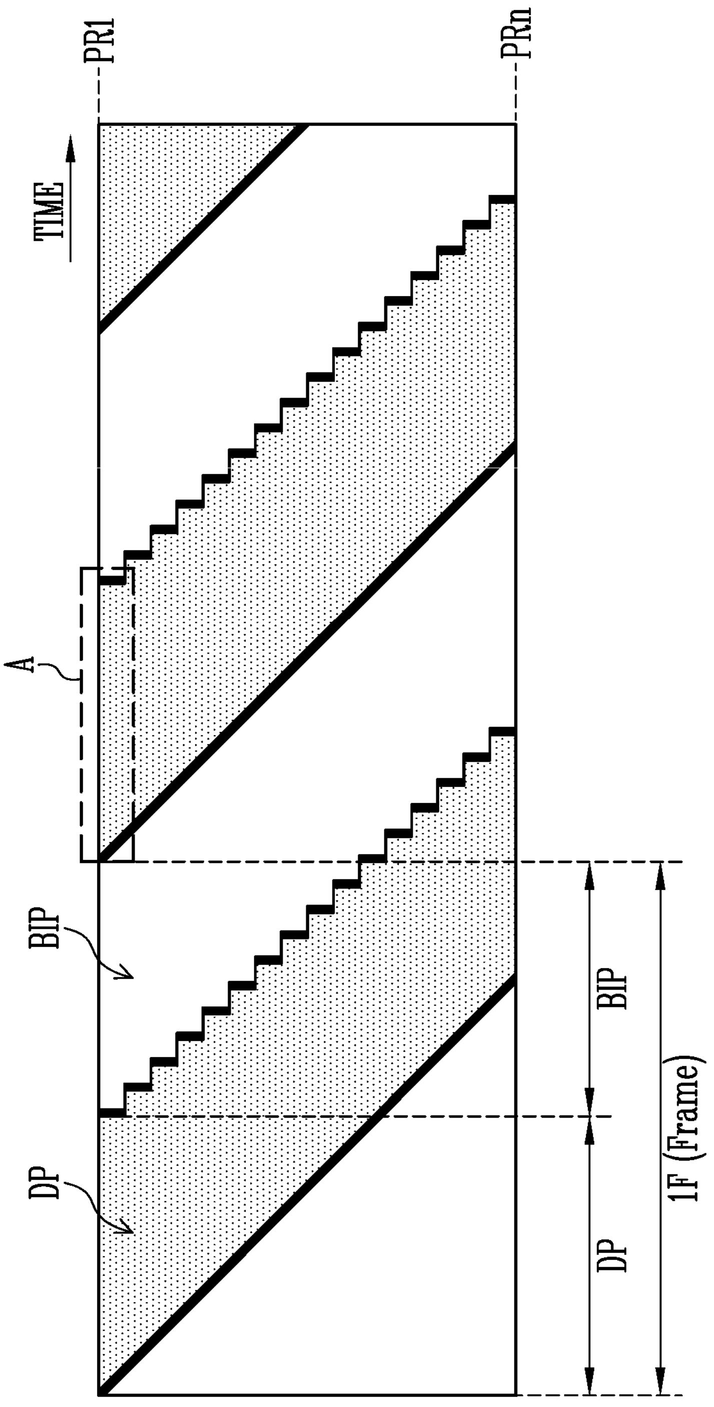
FIG. 4 is a drawing schematically showing a driving method of a display device of FIG. 1.

FIG. 4 is a drawing schematically showing a driving method of a display device of FIG. 1.

Referring to FIGS. 2 to 4, the display device 1000 (see FIG. 1) may supply (or write) both the image data voltage and the black data voltage Bdata to the first to n-th pixel rows PR1 to PRn during one frame 1F. That is, the display device 1000 (see FIG. 1) may insert the black image without increasing the frame rate.

According to some example embodiments, as shown in FIG. 4, an operation during one frame 1F of the first pixel row PR1 may be divided into an operation during the display period DP and the black insertion period BIP. The first pixel row PR1 may emit light with luminance corresponding to the image data voltage during the display period DP and output the black image during the black insertion period BIP.

Meanwhile, the scan signal for displaying the image during the display period DP may be sequentially supplied to the entire pixel unit 100 (see FIG. 1). Accordingly, the display period DP may be sequentially started in unit of pixel row.

The scan signal for inserting the black image during the black insertion period BIP may be simultaneously or concurrently supplied in units of pixel blocks BL1, BL2, and BL3 (see FIG. 1). For example, the scan signal is simultaneously or concurrently supplied to the pixel rows of the first pixel block BL1 (see FIG. 1) so that the black image data Bdata may be simultaneously or concurrently written. Therefore, the black insertion periods BIP of the pixel rows of the first pixel block BL1 may be started simultaneously or concurrently.

Next, the black image data Bdata may be simultaneously written to the pixel rows of the second pixel block BL2 (see FIG. 1) after a time period (e.g., a set or predetermined time period) has elapsed. Similarly, the same driving may be performed at time intervals (e.g., set or predetermined time intervals) for the other pixel blocks. As such, the black insertion period BIP may be sequentially started in unit of pixel block.

Figure 5:
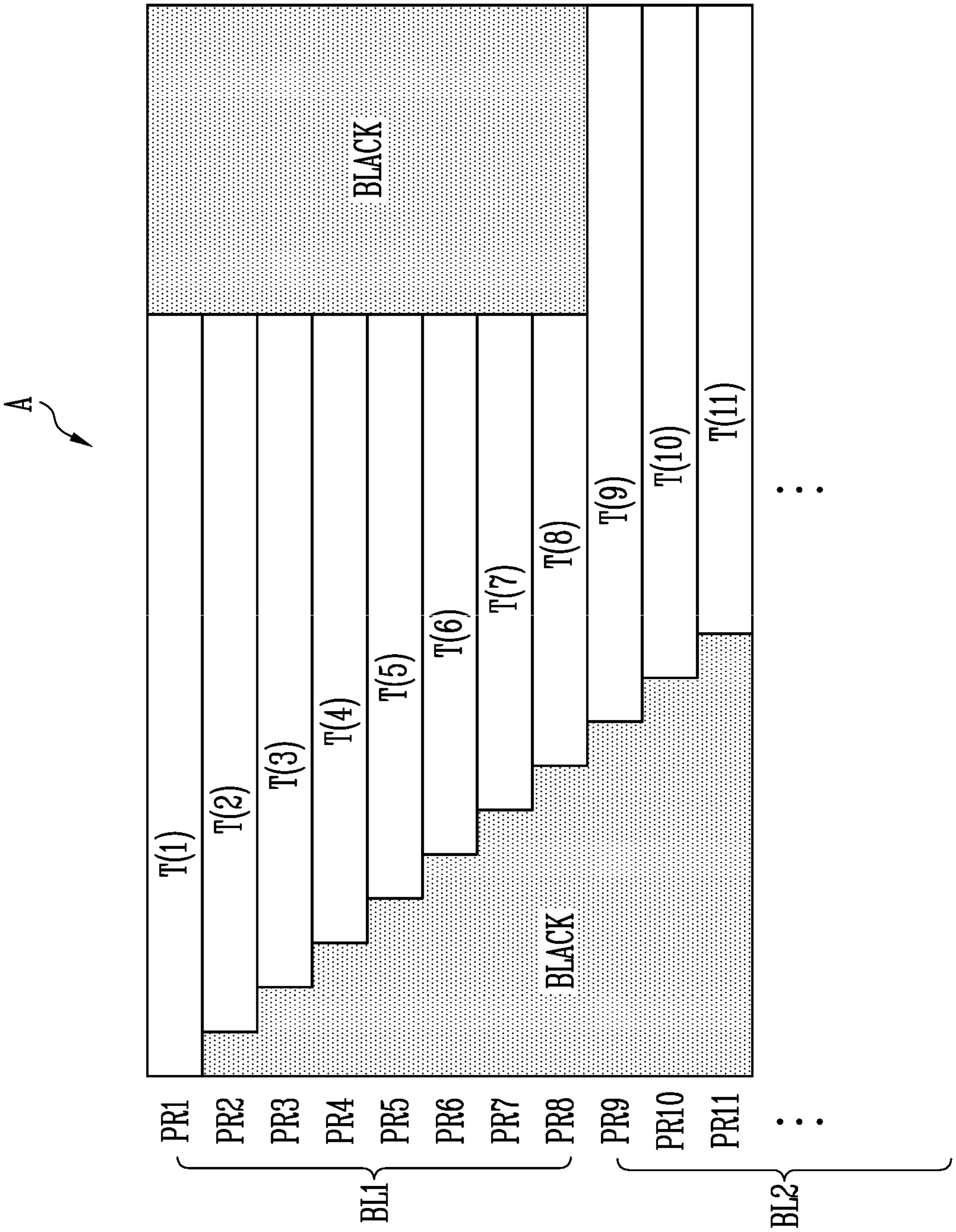
FIG. 5 is a drawing showing a part of a light emitting time of pixel rows corresponding to an 'A' portion of FIG. 4.

FIG. 5 is a drawing showing a part of a light emitting time of pixel rows corresponding to an 'A' portion of FIG. 4.

Referring to FIGS. 2 to 5, the display period DP of each of the pixel rows PR1 to PR8 included in the first pixel block BL1 may be different.

According to some example embodiments, as shown in FIG. 5, one pixel block may include eight pixel rows. For example, the first pixel block BL1 may include first to eighth pixel rows PR1 to PR8. However, this is merely an example, and the number of the pixel rows included in the pixel block is not limited thereto.

As described in reference with FIG. 4, the display period DP in the first pixel block BL1 may be sequentially performed in the order of first to eighth pixel rows PR1 to PR8. After the display period DP, the black insertion period BP may proceed simultaneously. Accordingly, the light emitting times T (1) to T (8) of each of the first to eighth pixel rows PR1 to PR8 may be different from each other. For example, as shown in FIG. 5, a length of the light emitting time may be decreased from the first pixel row PR1 to the eighth pixel row PR8.

The light emitting time and the display luminance are generally proportional. Therefore, the display luminance may be decreased from the first pixel row PR1 to the eighth pixel row PR8.

On the other hand, the second pixel block BL2 may perform substantially the same operation as the driving of the first pixel block BL1 with a time difference from the first pixel block BL1. Therefore, the light emitting time T (9) of the ninth pixel row PR9 may be substantially the same as the light emitting time T (1) of the first pixel row PR1. The light emitting times T (10) and T (11) of the tenth pixel row PR10 and eleventh pixel row PR11 may be substantially the same as the light emitting times T (2) and T (3) of the second pixel row PR2 and third pixel row PR3, respectively.

Accordingly, a sudden difference in the light emitting time and display luminance may occur between the light emitting time T (8) of the last pixel row (i.e., eighth pixel row PR8) of the first pixel block BL1 and the light emitting time T (9) of the first pixel row (i.e., ninth pixel row PR9) of the second pixel block BL2. The difference in the display luminance between the eighth pixel row PR8 and the ninth pixel row PR9 may be recognized as a larger difference to the user due to a Mach band effect. Therefore, there is a need for a configuration for minimizing or removing such difference in perceptible luminance due to the driving inserting the black image in unit of pixel block.

For example, the display luminance may be proportional to the driving current of the driving transistor (e.g., first transistor T1 in FIG. 2) included in the pixel PX as well as the light emitting time. Therefore, when the driving current at the pixel of the eighth pixel row PR8 is greater than the driving current at the pixel of the ninth pixel row PR9, and the first pixel row PR1 for the same grayscale or the same image data voltage, the luminance difference between the eighth pixel row PR8 and the ninth pixel row PR9 may be reduced. In addition, by reducing the luminance difference between the first to eighth pixel rows PR1 to PR8, the luminance difference between a boundary of the pixel block and a luminance deviation of the entire image may be reduced.

Figure 6:
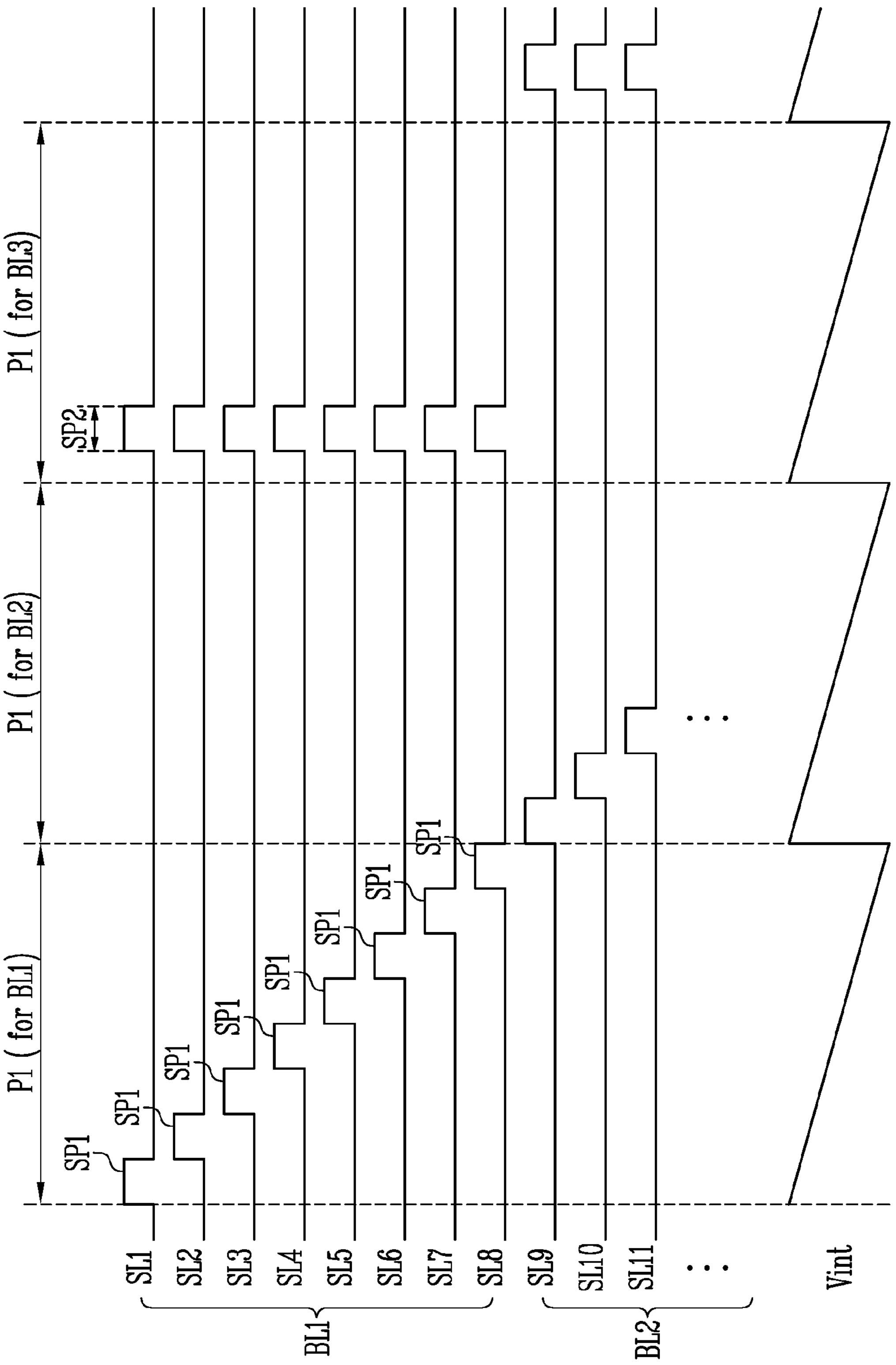
FIG. 6 is a waveform diagram showing an example of an operation of a display device of FIG. 1.
Figure 7:
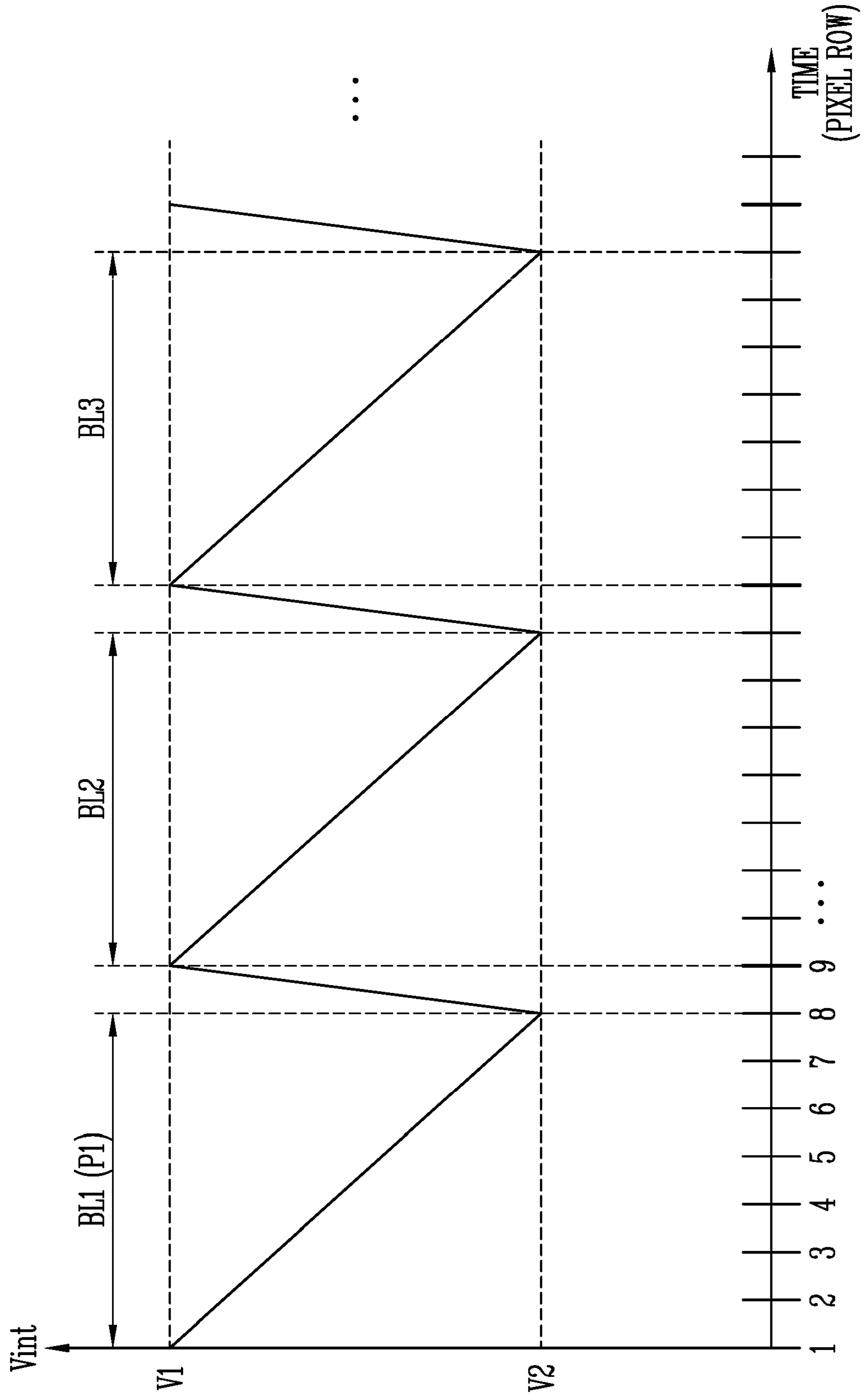
FIG. 7 is a drawing for explaining a change in a reference voltage of FIG. 6.

FIG. 6 is a waveform diagram showing an example of an operation of a display device of FIG. 1, and FIG. 7 is a drawing for explaining a change in a reference voltage of FIG. 6.

In FIG. 6, only the scan signal supplied to the scan lines are shown, and for better understanding and ease of description, the control signal supplied to the control lines is omitted.

Referring to FIGS. 2 to 7, a size of the reference voltage Vint may be changed with the first period P1 as one cycle during one frame 1F.

According to some example embodiments, the reference voltage Vint during the first period P1 may be gradually decreased. For example, the reference voltage Vint may be linearly decreased during the first period P1. However, this is merely an example, and a decrease form, a decrease slope, etc. of the reference voltage Vint is not limited thereto.

The first period P1 may be a period including the first scan period SP1 of each of the pixel rows included in each of the pixel blocks BL1, BL2, and BL3. For example, a period during which the scan signal is sequentially supplied to the first to eighth scan lines SL1 to SL8 of the first pixel block BL1 may be the first period P1. Similarly, each of a period during which the scan signal is sequentially supplied to the scan lines corresponding to the pixel rows of the second pixel block BL2, and a period during which the scan signal is sequentially supplied to the scan lines corresponding to the pixel rows of the third pixel block BL3 may be defined as the first period P1. Therefore, the driving that the reference voltage Vint is supplied with a decrease may be repeated during the first period P1 of the pixel blocks BL1, BL2, and BL3.

Meanwhile, in FIG. 6, a period between the first scan period SP1 and the second scan period SP2 may correspond to a real light emitting time (or display period DP) of the corresponding pixel row.

When the voltage of the second electrode of the first transistor T1 decreases under the same data voltage condition is decreased, the driving current may be increased. Because the display luminance is proportional to the driving current of the first transistor T1, the display luminance may be increased as the driving current is increased. Accordingly, when the size of the reference voltage Vint supplied to the pixel unit 100 is decreased during the first period P1, the display luminance of first to eighth pixel rows PR1 to PR8 may be adjusted to a similar level for the same grayscale (and the same image data voltage).

According to some example embodiments, the display luminance for each pixel row may be calculated by [Equation 1] below.

$$L'(N)=(T(1)/T(N))\cdot L(N) \quad \text{[Equation 1]}$$

Here, L'(N) is an expected display luminance of the N-th pixel row of the pixel block, T (1) is the light emitting time of the first pixel row of the pixel block, T (N) is the light emitting time of the N-th pixel row of the pixel block, and L (N) is an real display luminance of the N-th pixel row of the pixel block. At this time, when the pixel block includes k pixel rows, N may be a natural number of k or less. In addition, the real display luminance may be determined by the image data voltage supplied to the N-th pixel row.

As such, the expected display luminance may be determined according to a ratio of the light emitting time.

In addition, when assuming that the expected display luminance is proportional to the driving current of the first transistor T1, and applying the [Equation 1] in the drain current formula of the transistor, [Equation 2] below may be derived.

$$V\text{int}(N)=V\text{DATA}-(T(1)/T(N))^{0.5}\cdot(V\text{DATA}-V\text{int}(1)) \quad \text{[Equation 2]}$$

Here, Vint (N) is a reference voltage Vint corresponding to the N-th pixel row of the pixel block, VDATA is an image data voltage (e.g., a set or predetermined image data voltage), T (1) is the light emitting time of the first pixel row of the pixel block, T (N) is the light emitting time of the N-th pixel row of the pixel block, and Vint (1) is a reference voltage Vint corresponding to the first pixel row of the pixel block. At this time, Vint (1), and VDATA may be constants (e.g., set or predetermined constants).

For example, when the scan signal of the first scan period SP1 is supplied to the N-th pixel row, the reference voltage Vint having a size of Vint (N) may be supplied.

Accordingly, the power supply 500 (see FIG. 1) may output the reference voltage Vint with a waveform such as FIG. 6 so that the reference voltage Vint gradually may be decreased as the first scan period SP1 proceeds. For example, as shown in FIG. 7, the reference voltage Vint may be changed in response to the scan time (i.e., first scan periods) of the pixel rows between the first level V1 and the second level V2.

Therefore, the difference in the display luminance between first to eighth pixel rows PR1 to PR8 may be reduced. In addition, the difference in the display luminance between the last pixel row (e.g., eighth pixel row PR8) of the first pixel block BL1 and the first pixel row (e.g., ninth pixel row PR9) of the second pixel block BL2 may be minimized or may be reduced. Therefore, the difference in the perceptible luminance according to the difference in the light emitting time for each pixel row may be reduced or may be minimized in the display device 1000 (see FIG. 1) to which the black image insertion driving is applied, and the display quality may be improved.

Figure 8:
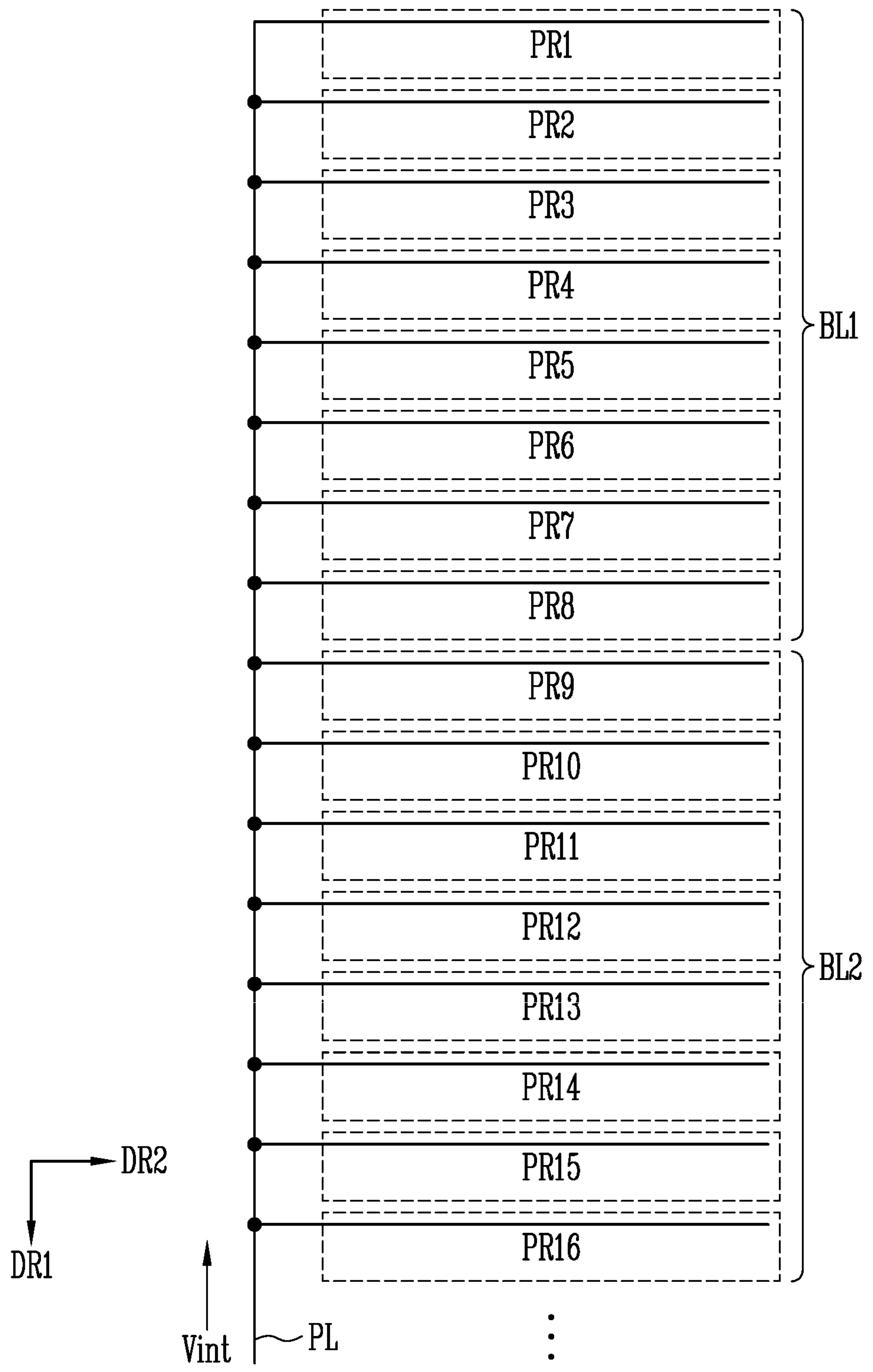
FIG. 8 is a drawing showing an example of a disposition of a power line supplying a reference voltage included in a display device of FIG. 1.

FIG. 8 is a drawing showing an example of a disposition of a power line supplying a reference voltage included in a display device of FIG. 1.

Referring to FIGS. 4 to 8, the power line PL supplying the reference voltage Vint may extend from one side of the pixel unit 100 (see FIG. 1) in the first direction DR1, and may be branched to each of the pixel rows PR1 to PR16.

For example, the power line PL extending in the first direction DR1 may branch to the second direction DR2.

According to some example embodiments, the power line PL may be patterned while overlapping with the pixel unit 100 (see FIG. 1). Therefore, the power supply 500 (see FIG. 1) may supply the reference voltage Vint in common to the power line PL.

Because the reference voltage Vint in the pixel PXij of FIG. 2 is supplied to the corresponding pixel PXij only when the third transistor T3 is turned on, the reference voltage Vint may be transferred to the entire pixel rows through the power line PL.

Figure 9:
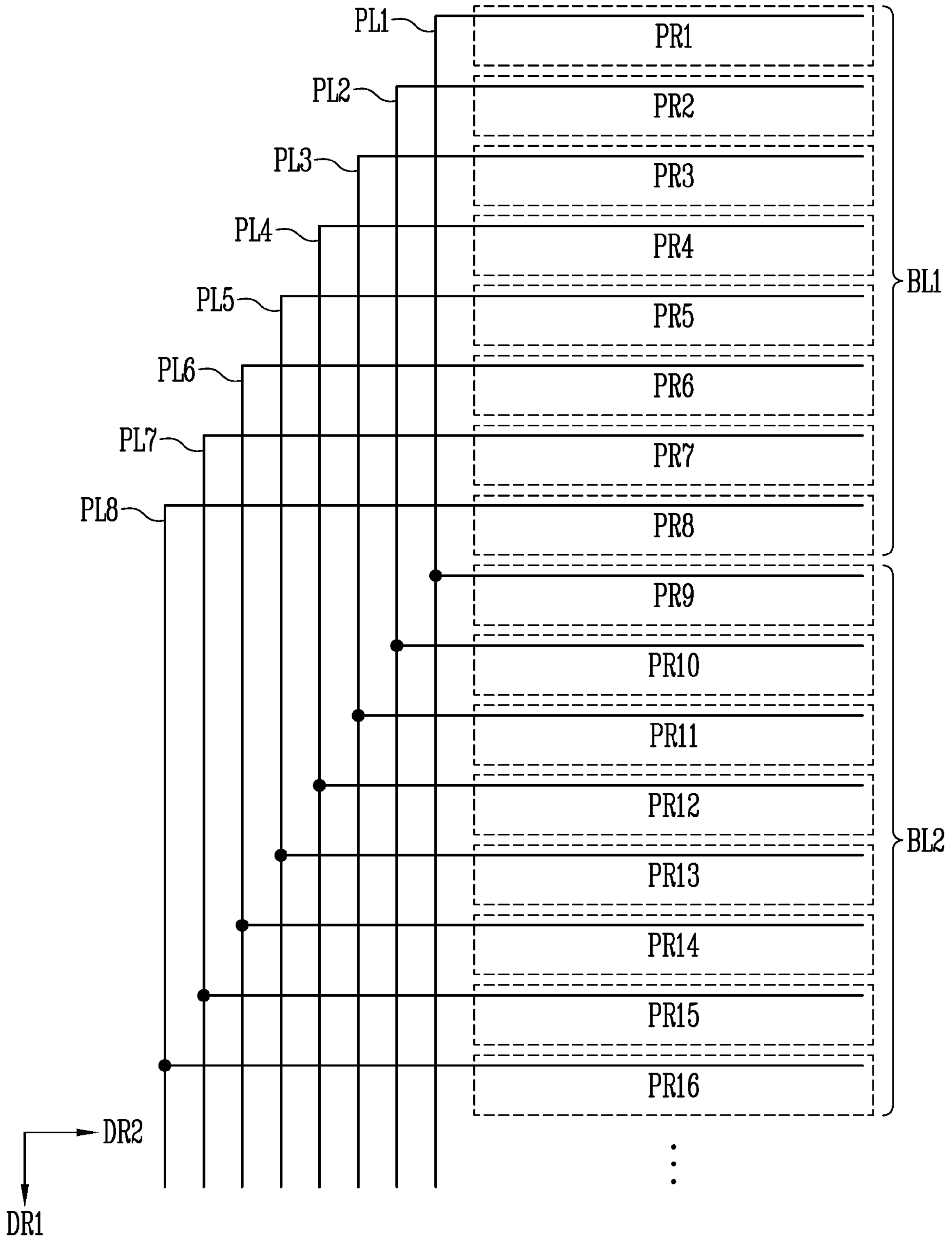
FIG. 9 is a drawing showing an example of a disposition of power lines supplying a reference voltage included in a display device of FIG. 1.
Figure 10:
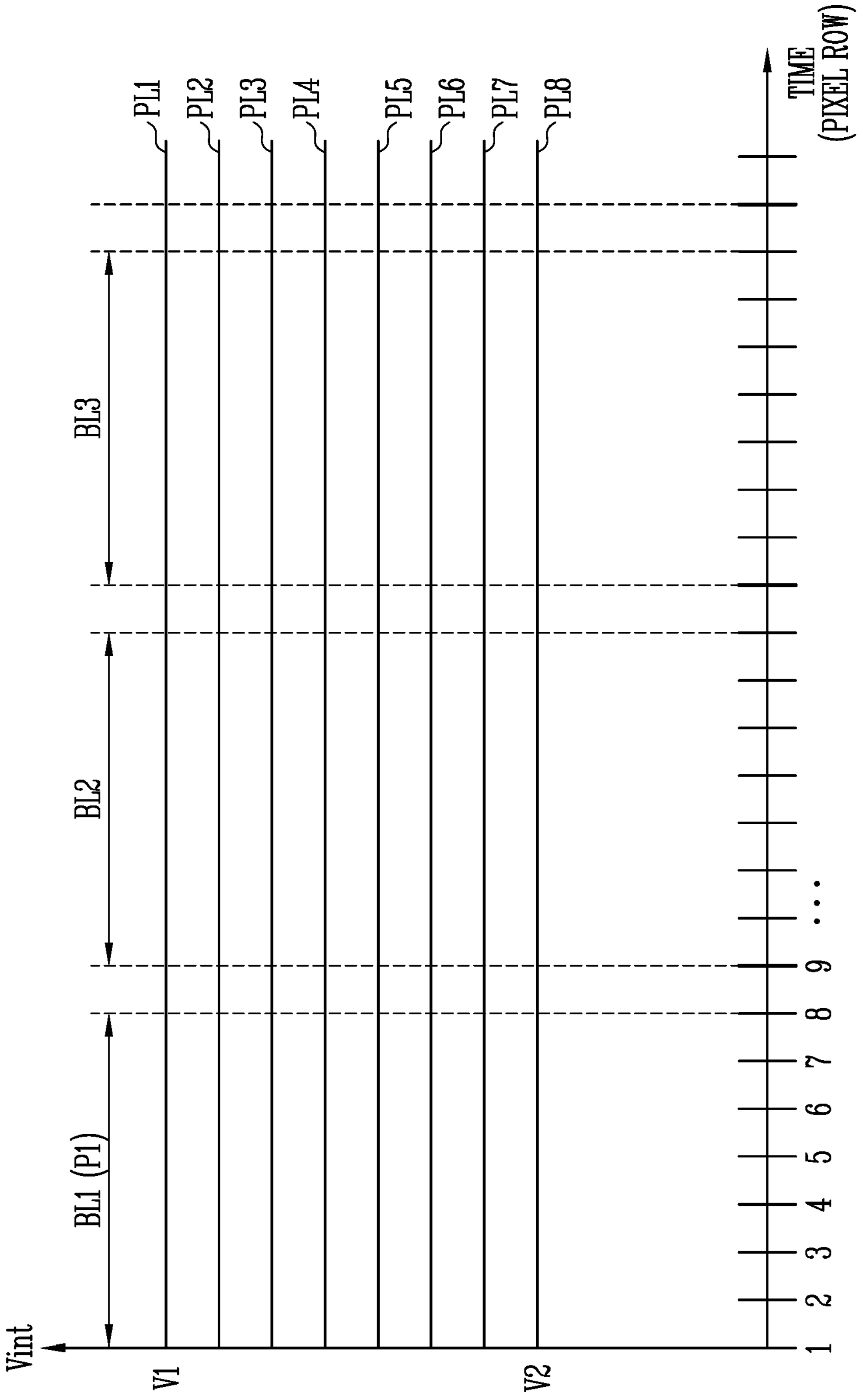
FIG. 10 is a drawing showing an example of a voltage level of a reference voltage supplied to power lines of FIG. 9.

FIG. 9 is a drawing showing an example of a disposition of power lines supplying a reference voltage included in a display device of FIG. 1, and FIG. 10 is a drawing showing an example of a voltage level of a reference voltage supplied to power lines of FIG. 9.

Referring to FIGS. 4 to 7, 9, and 10, the display device 1000 (see FIG. 1) may include the power lines PL1 to PL8 supplying the reference voltages Vint of different sizes.

According to some example embodiments, the power lines PL1 to PL8 may be disposed to extend from at least one side of the pixel unit 100 (see FIG. 1) in the first direction DR1. According to some example embodiments, the number of the power lines PL1 to PL8 may be determined to be the same as the number of pixel rows set for each pixel block. For example, when each of the first and second pixel blocks BL1 and BL2 includes eight pixel rows, the display device 1000 (see FIG. 1) may include first to eighth power lines PL1 to PL8. Each of the first to eighth power lines PL1 to PL8 may be branched in the second direction DR2 with a pixel row interval (e.g., a set or predetermined pixel row interval).

The first power line PL1 may be connected to the first pixel row PR1 and the ninth pixel row PR9. In other words, the first power line PL1 may be connected to the first pixel rows of the pixel blocks BL1 and BL2.

The second power line PL2 may be connected to the second pixel row PR2 and the tenth pixel row PR10. In other words, the second power line PL2 may be connected to the second pixel rows of the pixel blocks BL1 and BL2.

Similarly, the third to eighth power lines PL3 to PL8 may be connected to the third to last pixel rows PR3 to PR8 or PR11 to PR16 of the pixel blocks BL1 and BL2, respectively.

Meanwhile, as shown in FIG. 10, the voltage level of the reference voltage Vint supplied to each of the first to eighth power lines PL1 to PL8 may be different from each other. For example, the voltage of the first level V1 may be supplied to the first power line PL1, and the voltage of the second level V2 may be supplied to the eighth power line PL8. The different voltage levels between the first level V1 and the second level V2 may be supplied to the second to seventh power lines PL2 to PL7.

As described above, because a constant voltage is supplied to each pixel row, there is no need to change the reference voltage Vint in real time. Therefore, the reference voltage Vint may be stably supplied to each pixel row PR1 to PR16.

Figure 11:
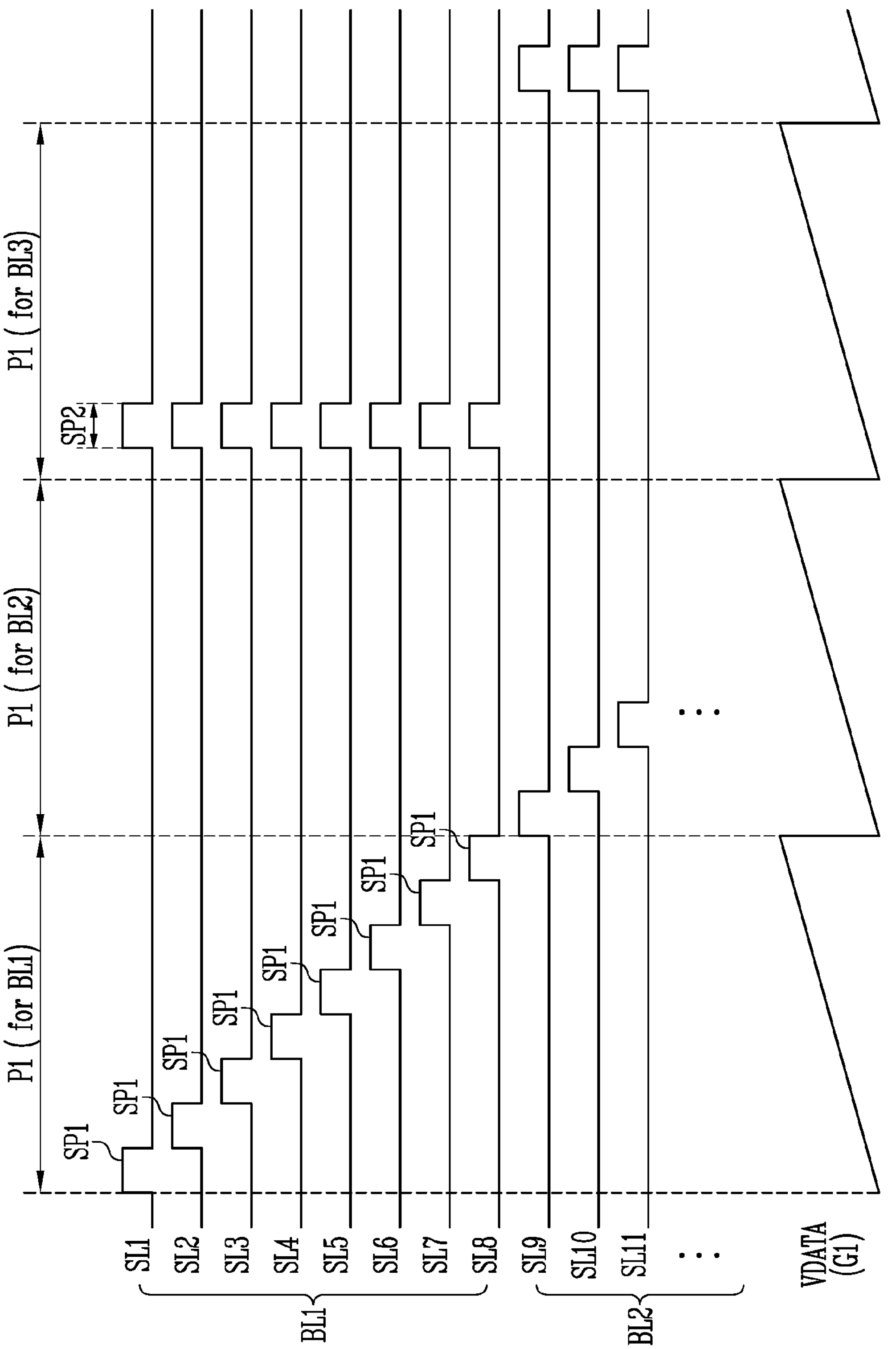
FIG. 11 is a waveform diagram showing an example of an operation of a display device of FIG. 1.
Figure 12:
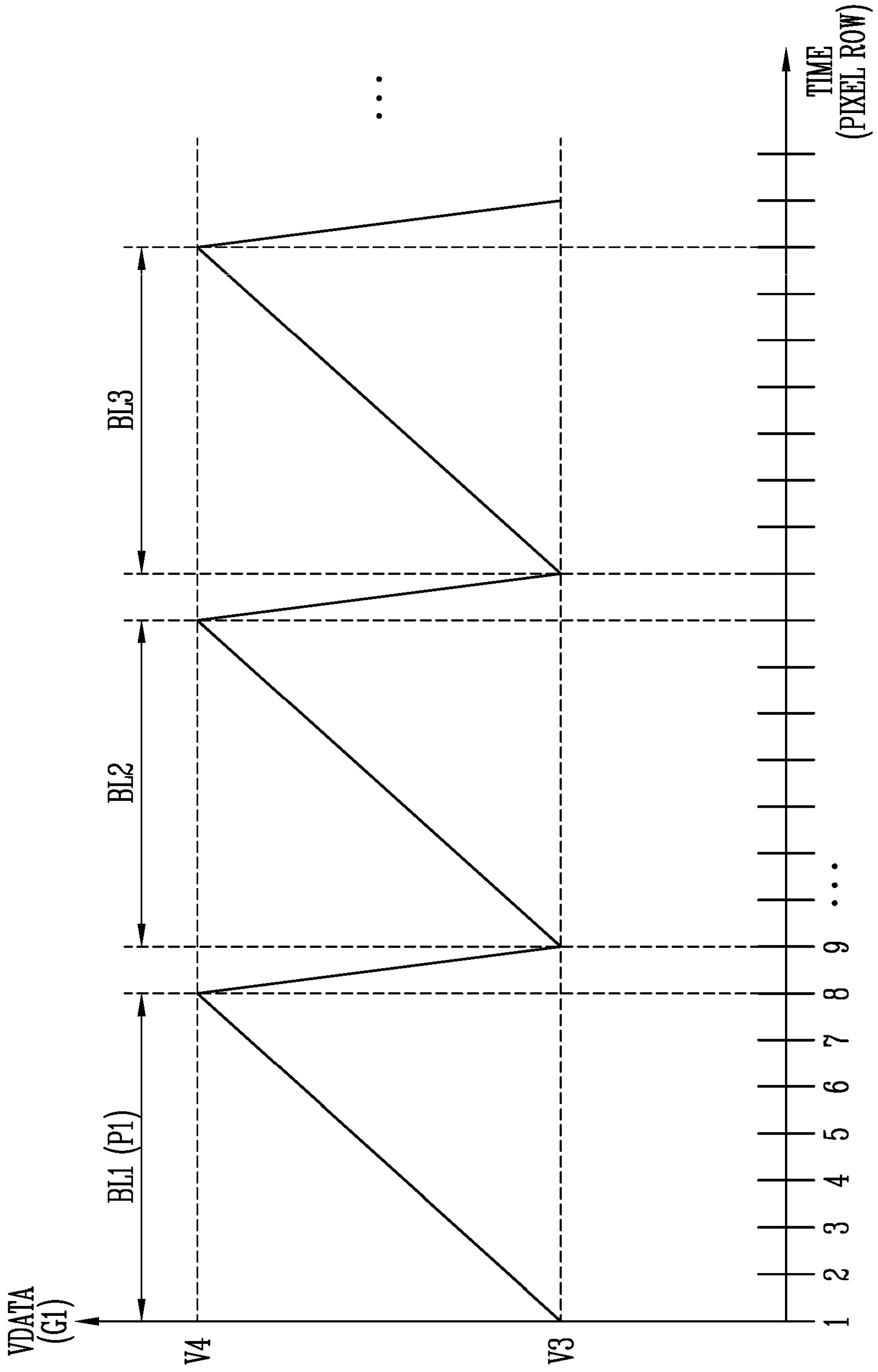
FIG. 12 is a drawing specifically illustrating a change in an image data voltage of FIG. 11.

FIG. 11 is a waveform diagram showing an example of an operation of a display device of FIG. 1, and FIG. 12 is a drawing specifically illustrating a change in an image data voltage of FIG. 11.

In FIG. 11, only the scan signals supplied to the scan lines are shown, and the control signals supplied to the control lines are omitted for better understanding and ease of description.

Referring to FIGS. 3, 4, 11, and 12, a size of the image data voltage VDATA corresponding to the same grayscale may be changed with the first period P1 as one cycle.

Hereinafter, the image data voltage VDATA may be a voltage value corresponding to the first grayscale G1 of the image data. The first grayscale G1 may be any grayscale selected from grayscales applied to the display device.

According to some example embodiments, the image data voltage VDATA may be gradually increased during the first period P1. For example, the image data voltage VDATA may be linearly increased during the first period P1. However, this is merely an example, and an increase form, an increase slope, etc. of the image data voltage VDATA is not limited thereto.

The first period P1 may be a period including the first scan period SP1 of each of the pixel rows included in each of the pixel blocks BL1, BL2, and BL3.

When the gate voltage of the first transistor T1 is increased under the same grayscale condition, the driving current may be increased. Because the display luminance is proportional to the driving current of the first transistor T1, the display luminance may be increased as the driving current is increased. Accordingly, when the image data voltage VDATA is increased for the same grayscale during the first period P1, the display luminance of the first to eighth pixel rows PR1 to PR8 may be adjusted to a similar level even if the light emitting time is decreased.

For example, when [Equation 1] is applied to the drain current formula of the transistor, a size of the image data voltage supplied to the corresponding pixel row of the corresponding grayscale may be derived by [Equation 3] below.

$$VDATA(N)=(T(1)/T(N))^{0.5}\cdot(VDATA(1)-Vint)+Vint \quad \text{[Equation 3]}$$

Here, VDATA (N) is the image data voltage VDATA of the first grayscale G1 corresponding to the N-th pixel row of the pixel block, Vint is a reference voltage (e.g., a set or predetermined reference voltage), T (1) is the light emitting time of the first pixel row of the pixel block, T (N) is the light emitting time of the N-th pixel row of the pixel block, VDATA (1) is the image data voltage VDATA of the first grayscale G1 corresponding to the first pixel row of the pixel block.

For example, when the scan signal of the first scan period SP1 is supplied to the N-th pixel row, the image data voltage VDATA having a size of VDATA (N) may be supplied.

Accordingly, the data driver 300 (see FIG. 1) may output the image data voltage VDATA with a waveform such as FIG. 11 so that the image data voltage VDATA of the first grayscale G1 gradually may be increased as the first scan period SP1 proceeds. For example, as shown in FIG. 12, the image data voltage VDATA may be changed in response to the scan time (i.e., first scan periods) of the pixel rows between the third level V3 and the fourth level V4.

Therefore, the difference in the display luminance between the first to eighth pixel rows PR1 to PR8 may be reduced. In addition, the difference in the display luminance between the last pixel row (e.g., eighth pixel row PR8) of the first pixel block BL1 and the first pixel row (e.g., ninth pixel row PR9) of the second pixel block BL2 may be minimized or may be reduced. Therefore, the difference in the perceptible luminance according to the difference in the light emitting time for each pixel row may be reduced or be minimized in the display device 1000 (see FIG. 1) to which the black image insertion driving is applied, and the display quality may be improved.

Meanwhile, the reference voltage Vint may be changed together with a change in the image data voltage VDATA. For example, during the first period P1, the reference voltage Vint may be gradually decreased.

Figure 13:
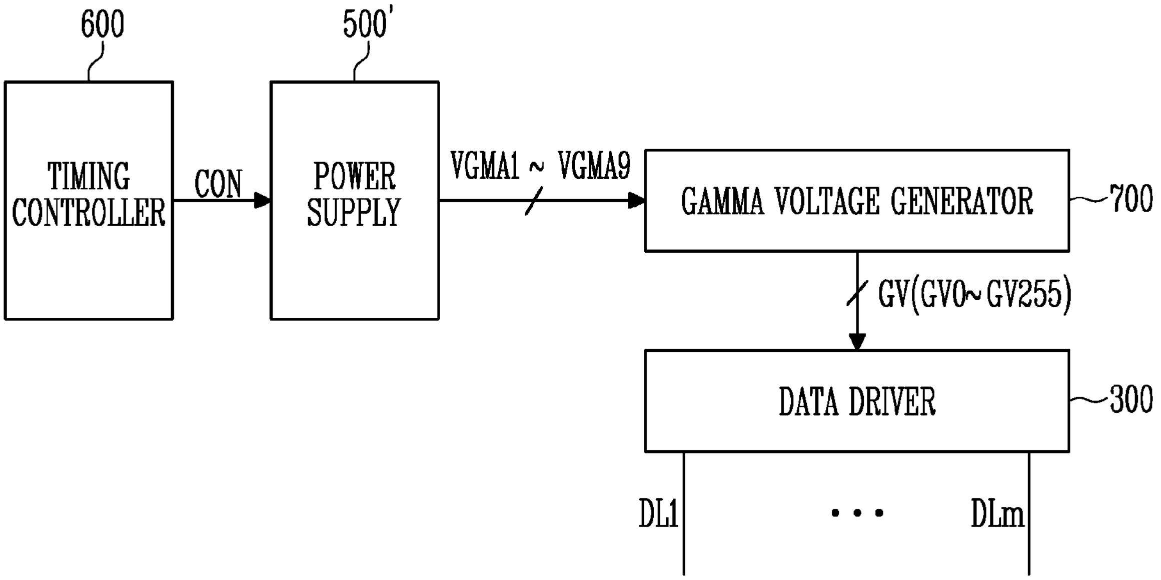
FIG. 13 is a block diagram showing an example of a portion configuration of a display device of FIG. 1.

FIG. 13 is a block diagram showing an example of a portion configuration of a display device of FIG. 1.

Referring to FIGS. 1, 11, and 13, the display device 1000 may further include a gamma voltage generator 700.

According to some example embodiments, the power supply 500' may further generate gamma tap voltages VGMA1 to VGMA9 (or gamma reference voltages) supplied to the gamma voltage generator 700. For example, the power supply 500' may determine the size of the first to ninth gamma tap voltages VGMA1 to VGMA9 based on the control signal CON supplied from the timing controller 600. That is, the voltage level of the gamma tap voltages VGMA1 to VGMA9 may be changed for adjustment for each pixel row of the image data voltage VDATA described with reference to FIGS. 11 and 12.

For example, the first gamma tap voltage may be a gamma voltage (or image data voltage) corresponding to a white grayscale, and the ninth gamma tap voltage VGMA9 may be a gamma voltage (or image data voltage) corresponding to a black grayscale.

According to some example embodiments, the control signal CON may include a command to change the size (or voltage level) of at least one of the first to ninth gamma tap voltages VGMA1 to VGMA9 for each written period (e.g., first scan period) of each pixel row. Therefore, the power supply 500' may adjust the voltage level of the first to ninth gamma tap voltages VGMA1 to VGMA9 in real time in unit of pixel row.

For example, the first to ninth gamma tap voltages VGMA1 to VGMA9 may be selected in a corresponding pixel row from a register or a memory in which values set according to the order of the pixel rows for each pixel block are stored. However, this is merely an example, and the method in which the first to ninth gamma tap voltages VGMA1 to VGMA9 are determined or output from the power supply 500' is not limited thereto.

The gamma voltage generator 700 may generate the gamma voltages GV (i.e., image data voltages) corresponding to the entire grayscales of the display device 1000 based on the first to ninth gamma tap voltages VGMA1 to VGMA9. The gamma voltages GV may be supplied to the data driver 300. For example, the gamma voltages GV may include voltage values (e.g., GV0 to GV255) corresponding to each of 256 grayscales.

According to some example embodiments, the gamma voltage generator 700 may include a resistance string dividing the first to ninth gamma tap voltages VGMA1 to VGMA9. For example, the gamma voltages GV may be determined based on the first to ninth gamma tap voltages VGMA1 to VGMA9 and the gamma curves (e.g., set or predetermined gamma curves) (e.g., 2.2 gamma curves, etc.).

Figure 14:
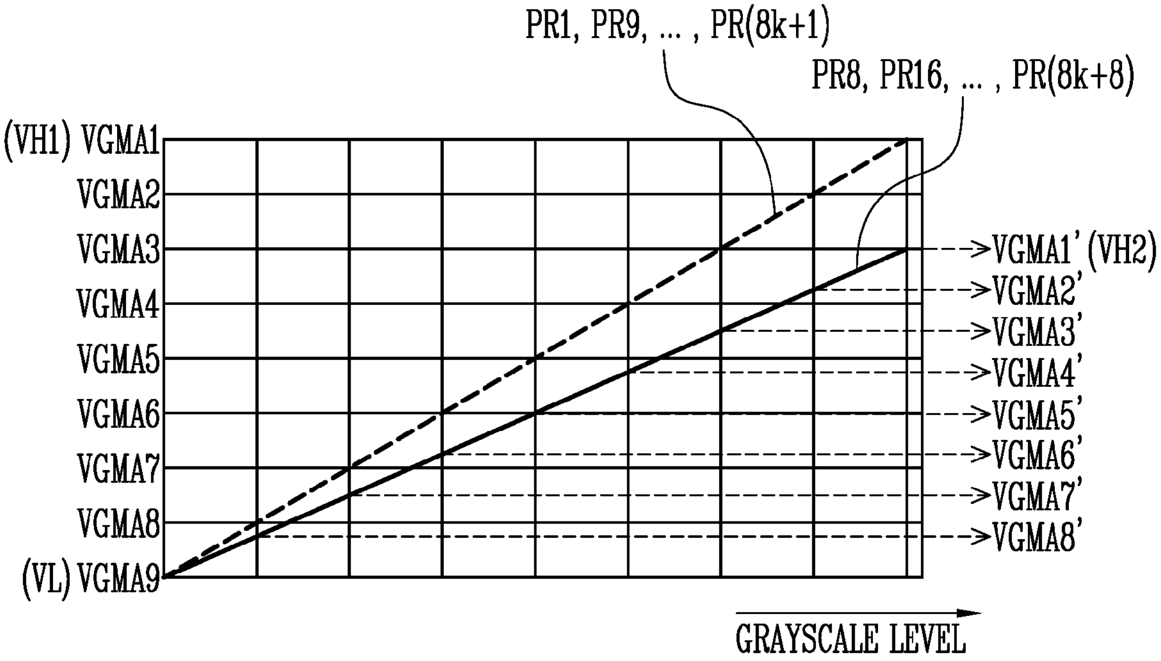
FIG. 14 is a drawing showing an example in which s gamma tap voltage is set in a pixel row.

FIG. 14 is a drawing showing an example in which s gamma tap voltage is set in a pixel row.

Referring to FIGS. 4, 13, and 14, the gamma tap voltages may be determined to different values according to on the pixel row of the pixel block.

For example, the first to ninth gamma tap voltages VGMA1 to VGMA9 corresponding to the first pixel rows PR1, PR9, . . . , PR (8k+1) of the pixel blocks may be determined from a voltage range between a first high voltage VH1 and a low voltage VL.

The first to eighth gamma tap voltages VGMA1' to VGMA8' corresponding to the last pixel rows PR8, PR16, . . . , PR (8k+8) of each of the pixel blocks may be determined from a voltage range between a second high voltage VH2 and the low voltage VL. Here, the second high voltage VH2 may be less than the first high voltage VH1.

Therefore, the first to eighth gamma tap voltages VGMA1' to VGMA8' corresponding to the last pixel rows PR8, PR16, . . . , PR (8k+8) of the pixel blocks may have a voltage value less than the first to eighth gamma tap voltages VGMA1 to VGMA8 corresponding to the first pixel rows PR1, PR9, . . . , PR (8k+1) of the pixel blocks, respectively. For example, a function connecting the gamma tap voltages corresponding to each pixel row may be expressed as a straight line of a primary function, and a slope of the straight line may be decreased from the first pixel row of each pixel block to the last pixel row thereof.

In addition, a function of the gamma tap voltage corresponding to each of the second to seventh pixel rows PR2 to PR7 may be formed with different slopes between two straight lines shown in FIG. 14.

In FIG. 14, the low voltage VL is shown to be constant, but is not limited thereto. For example, the ninth gamma tap voltage corresponding to the last pixel rows PR8, PR16, . . . , PR (8k+8) of the pixel blocks may be greater than the ninth gamma tap voltage VGMA9 corresponds to the first pixel rows PR1, PR9, . . . , PR (8k+1) of the pixel blocks.

As described above, the gamma tap voltages VGAM1 to VGMA9 corresponding to each of the pixel rows of the pixel block be changed, so that the gamma voltages GV supplied to the data driver 300 may be changed in real time in the pixel row.

Figure 15:
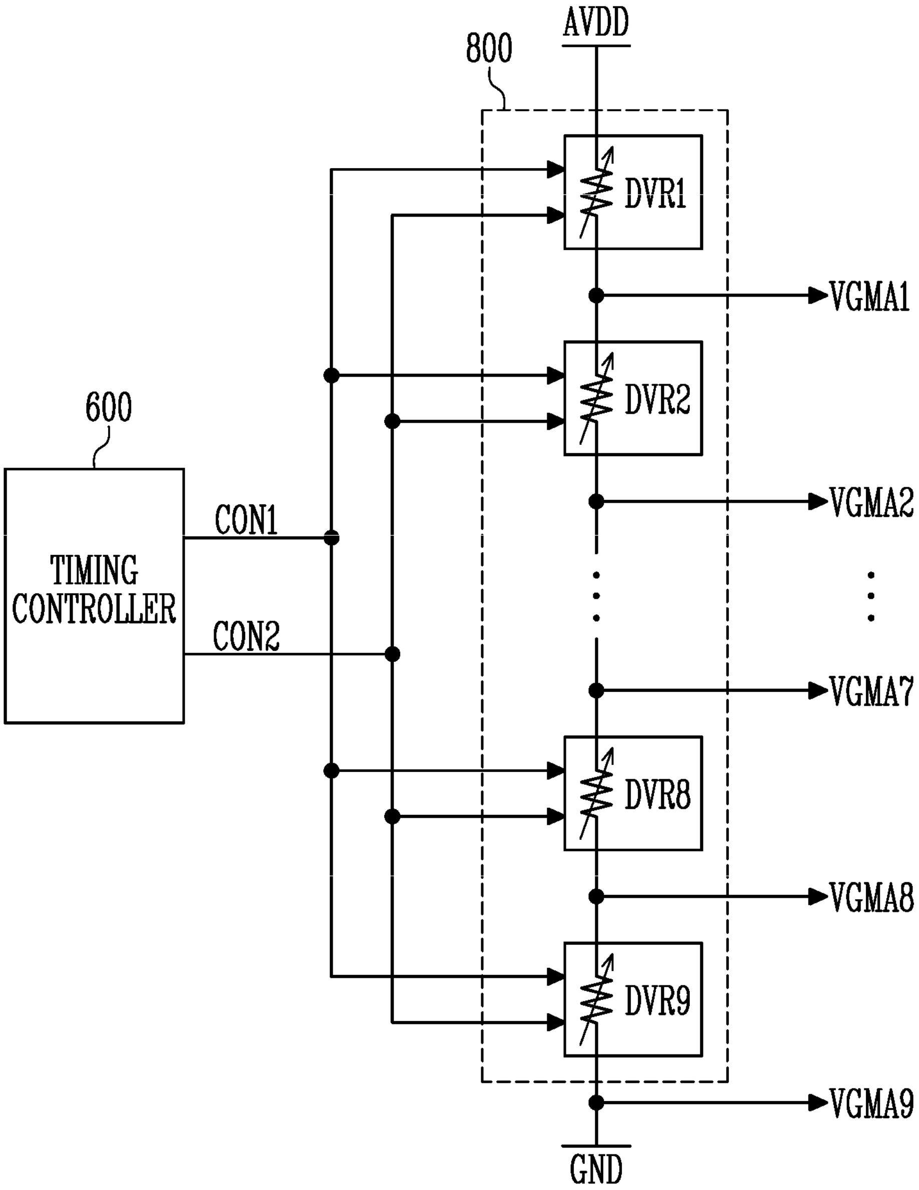
FIG. 15 is a drawing showing an example of a configuration for setting a gamma tap voltage of FIG. 14.

FIG. 15 is a drawing showing an example of a configuration for setting a gamma tap voltage of FIG. 14.

The configuration of FIG. 15 may have a configuration similar to FIG. 13 except that the function of the power supply 500' of FIG. 13 is replaced by gamma tap voltage generator 800.

Referring to FIGS. 1, 11, 13, 14, and 15, the display device 1000 may further include a gamma tap voltage generator 800 and a gamma voltage generator 700.

The gamma tap voltage generator 800 may adjust the gamma tap voltages VGMA1 to VGMA9 as the pixel rows included in each of the pixel blocks BL1, BL2, and BL3 are sequentially selected.

According to some example embodiments, the gamma tap voltage generator 800 may include a plurality of digital variable resistors DVR1 to DVR9 (or digital potentiometer) that generate the gamma tap voltages VGMA1 to VGMA9 by dividing the reference voltage AVDD and a ground voltage GND. The digital variable resistors DVR1 to DVR9 may be formed by programming resistance values corresponding to a condition or command (e.g., a set or predetermined condition or command). For example, when the pixel block includes eight pixel rows, eight resistance values corresponding to each pixel row may be programmed in each of the digital variable resistors DVR1 to DVR9.

Resistance values of the digital variable resistors DVR1 to DVR9 may be changed based on the first and second control signals CON1 and CON2 supplied from the timing controller 600. For example, the first and second control signals CON1 and CON2 may include a signal determining a change timing of resistance value, a signal including information on a changed resistance value, and the like.

The gamma tap voltages VGMA1 to VGMA9 may include values such as FIG. 14 in the pixel rows.

According to some example embodiments, the gamma tap voltage generator 800 may change the gamma tap voltages VGMA1 to VGMA9 by changing the reference voltage AVDD. Accordingly, the gamma tap voltages VGMA1 to VGMA9 corresponding to each of the pixel rows may be output by using a simple algorithm and circuit configuration.

Figure 16:
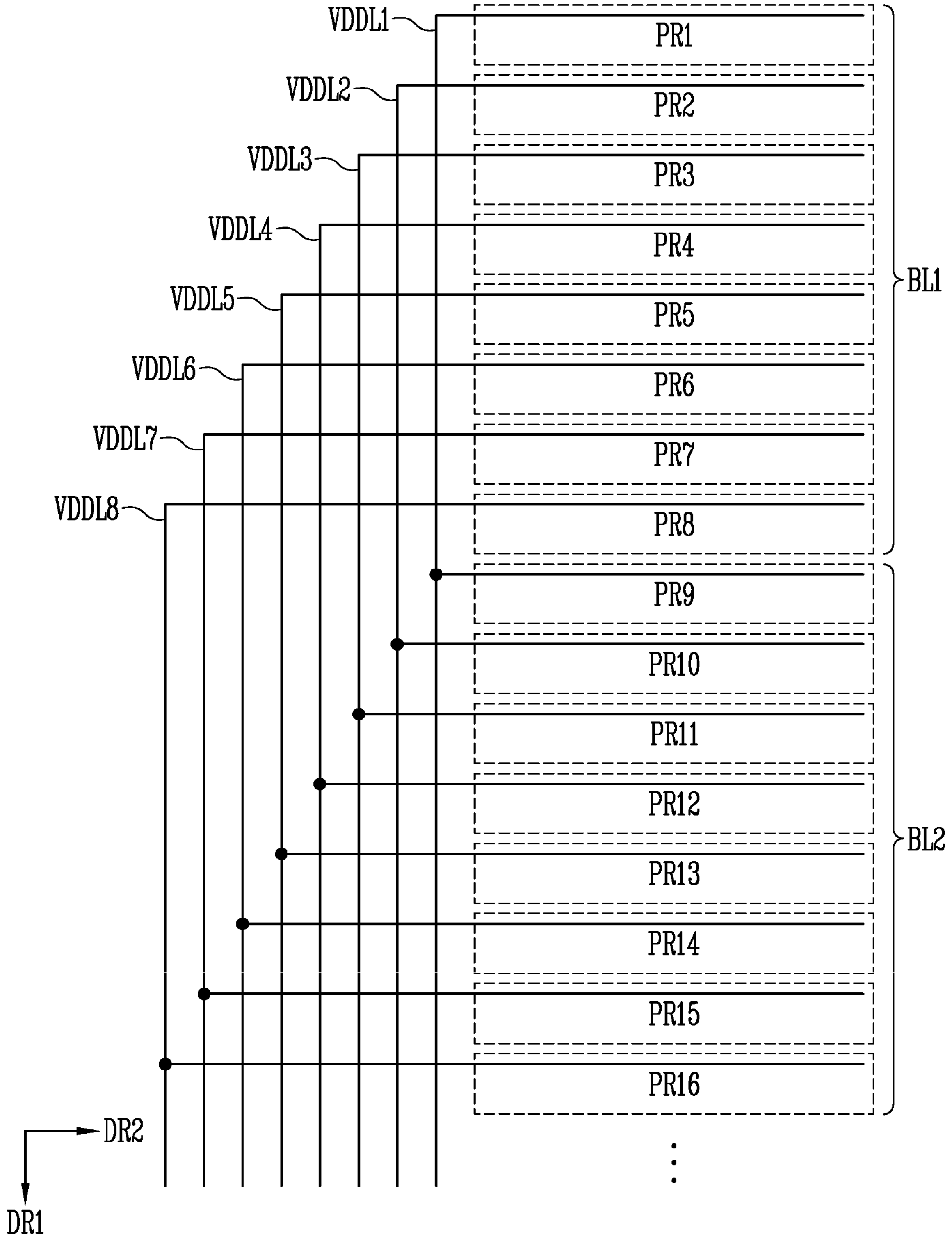
FIG. 16 is a drawing showing an example of a disposition of driving power lines that supply a first driving power supply included in a display device of FIG. 1.
Figure 17:
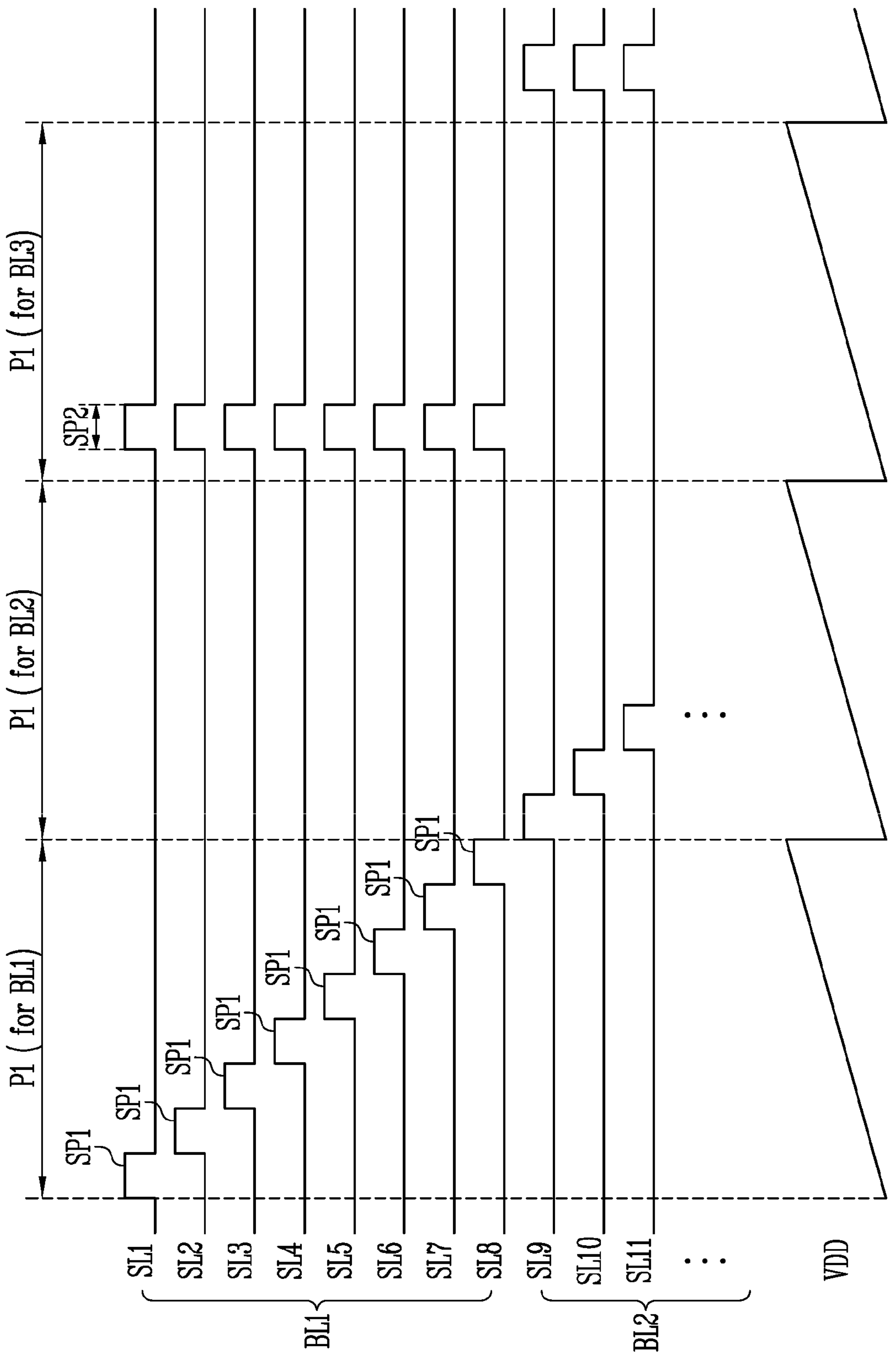
FIG. 17 is a drawing showing an example of an operation of a display device including driving power lines of FIG. 16.

FIG. 16 is a drawing showing an example of a disposition of driving power lines that supply a first driving power supply included in a display device of FIG. 1, and FIG. 17 is a drawing showing an example of an operation of a display device including driving power lines of FIG. 16.

Referring to FIGS. 2, 5, 16, and 17, the voltage of the first driving power supply VDD may be changed with the first period P1 as one cycle.

According to some example embodiments, as the voltage of the first driving power supply VDD for the same image data voltage VDATA is increased, the driving current may be increased. The power supply 500 (see FIG. 1) may output the voltage of the first driving power supply VDD with a waveform as shown in FIG. 17.

Meanwhile, the first driving power supply VDD may be simultaneously (or concurrently) supplied to all pixels. In order to spatially separate the voltage level of the first driving power supply VDD, the display device 1000 (see FIG. 1) may include a high potential driving power lines VDDL1 to VDDL8 supplying voltages of the first driving power supply VDD of different sizes.

The high potential driving power lines VDDL1 to VDDL8 may be disposed to extend from at least one side of the pixel unit 100 (see FIG. 1) in the first direction DR1. According to some example embodiments, when each of the pixel blocks BL1 and BL2 include eight pixel rows, the display device 1000 (see FIG. 1) may include the first to eighth high potential driving power lines VDDL1 to VDDL8. Each of the first to eighth high potential driving power lines VDDL1 to VDDL8 may be branched in the second direction DR2 with a pixel row interval (e.g., a set or predetermined pixel row interval).

The first high potential driving power line VDDL1 may be connected to the first pixel row PR1 and the ninth pixel row PR9. In other words, the first high potential driving power line VDDL1 may be connected to the first pixel rows of the pixel blocks BL1 and BL2.

The second high potential driving power line VDDL2 may be connected to the second pixel row PR2 and tenth pixel row PR10. In other words, the second high potential driving power line VDDL2 may be connected to the second pixel rows of the pixel blocks BL1 and BL2.

Similarly, the third to eighth high potential driving power lines VDDL3 to VDDL8 may be connected to the third to last pixel rows PR3 to PR8 or PR11 to PR16 of the pixel blocks BL1 and BL2, respectively.

As described above, the difference in the display luminance between the pixel rows PR1 to PR16 may be minimized or reduced by supplying the voltage of the first driving power supply VDD of different sizes for each pixel row in the pixel blocks BL1 and BL2.

Figure 18:
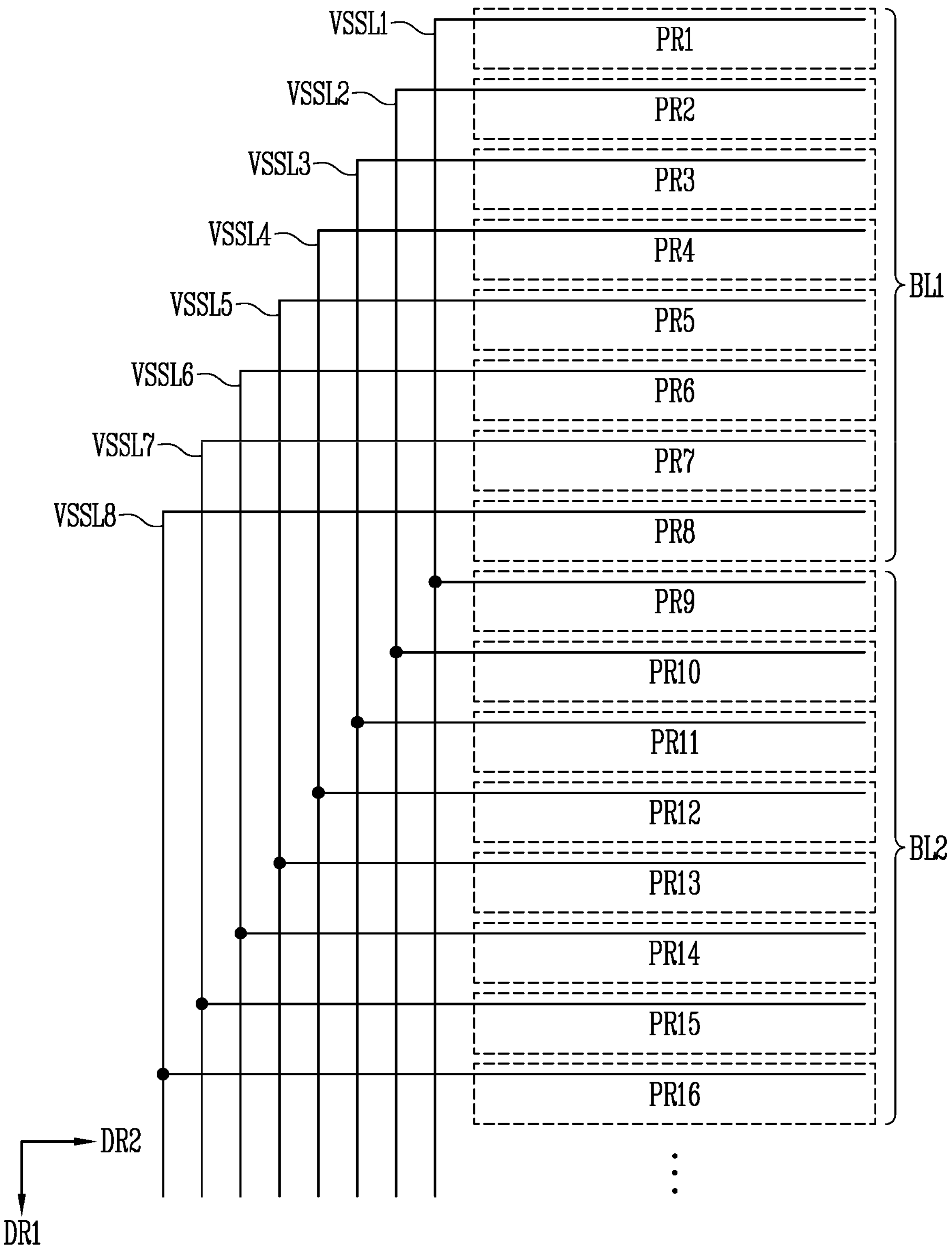
FIG. 18 is a drawing showing an example of a disposition of driving power lines that supply a second driving power supply included in a display device of FIG. 1.
Figure 19:
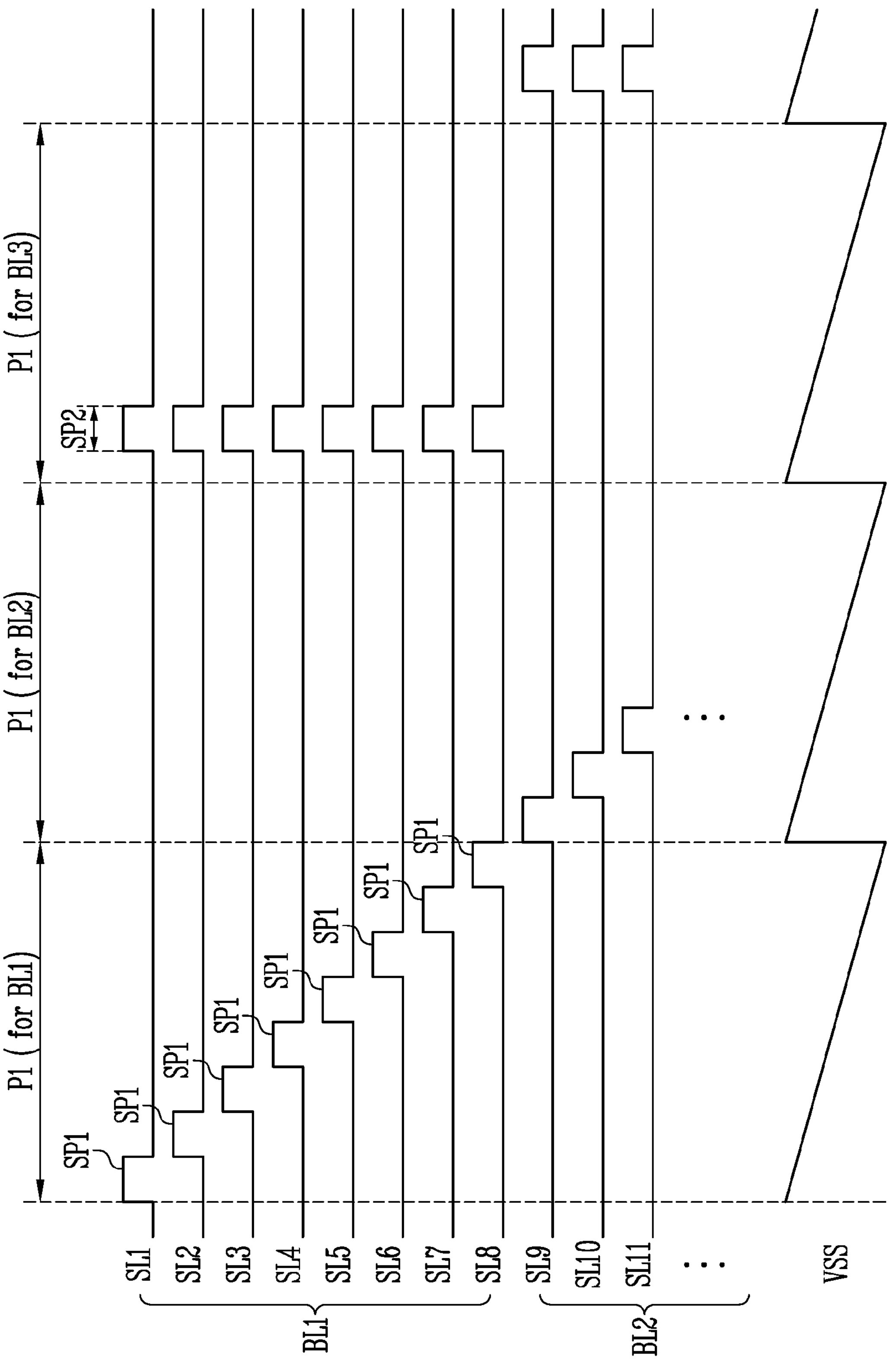
FIG. 19 is a drawing showing an example of an operation of a display device including driving power lines of FIG. 0.18.

FIG. 18 is a drawing showing an example of a disposition of driving power lines that supply a second driving power supply included in a display device of FIG. 1, and FIG. 19 is a drawing showing an example of an operation of a display device including driving power lines of FIG. 18.

Referring to FIGS. 2, 5, 18, and 19, the voltage of the second driving power supply VSS may be changed with the first period P1 as one cycle.

According to some example embodiments, as the voltage of the second driving power supply VSS for the same image data voltage VDATA is decreased, the driving current may be increased. The power supply 500 (see FIG. 1) may output the voltage of the second driving power supply VSS with a waveform as shown in FIG. 19.

Meanwhile, the second driving power supply VSS may be simultaneously or concurrently supplied to all pixels. In order to spatially separate the voltage level of the second driving power supply VSS, the display device 1000 (see FIG. 1) may include a low potential driving power lines VSSL1 to VSSL8 supplying voltages of the second driving power supply VSS of different sizes.

The low potential driving power lines VSSL1 to VSSL8 may be disposed to extend from at least one side of the pixel unit 100 (see FIG. 1) in the first direction DR1. According to some example embodiments, when each of the pixel blocks BL1 and BL2 include eight pixel rows, the display device 1000 (see FIG. 1) may include the first to eighth low potential driving power lines VSSL1 to VSSL8. Each of the first to eighth low potential driving power lines VSSL1 to VSSL8 may be branched in the second direction DR2 with a pixel row interval (e.g., a set or predetermined pixel row interval).

As shown in FIG. 18, the difference in the display luminance between the pixel rows PR1 to PR16 may be minimized or reduced by supplying a voltage of the second driving power supply VSS of different sizes for each pixel row in the pixel blocks BL1 and BL2.

Figure 20:
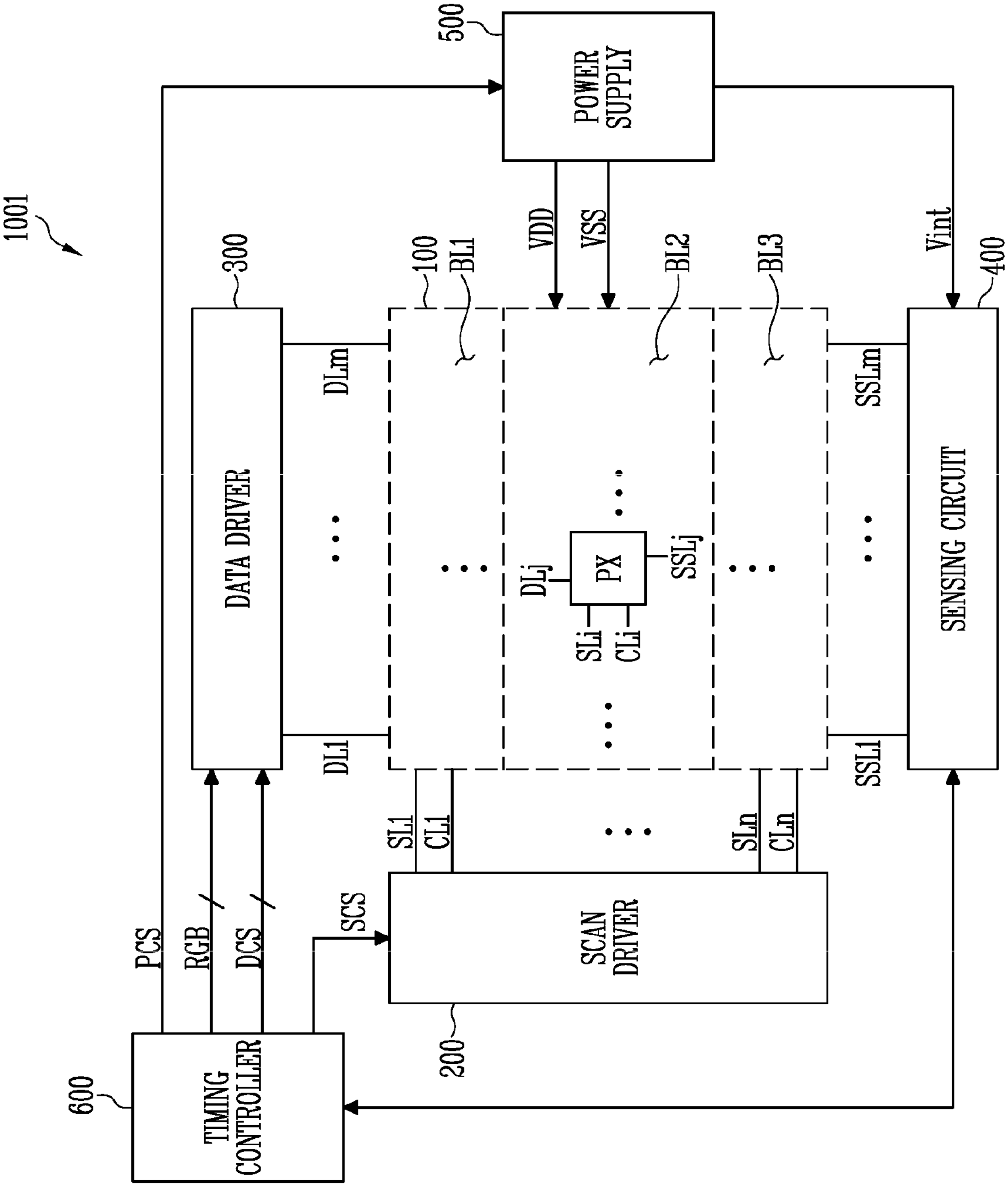
FIG. 20 is a block diagram showing a display device according to some example embodiments of the present invention.

FIG. 20 is a block diagram showing a display device according to some example embodiments of the present invention.

In FIG. 20, the same reference numerals are used for constituent elements described with reference to FIG. 1, and duplicate description of these constituent elements will be omitted. In addition, the display device 1001 of FIG. 20 may have a configuration substantially equivalent to or similar to the display device 1000 of FIG. 1 except for a line to which the sensing circuit 400 and the reference voltage Vint are supplied.

Referring to FIG. 20, the display device 1001 may include a pixel unit 100, a scan driver 200, a data driver 300, a sensing circuit 400, a power supply 500, and a timing controller 600.

The timing controller 600 may further control the operation of the sensing circuit 400. For example, the timing controller 600 may control timing for supplying the reference voltage Vint to the pixel PX through sensing lines SSL1 to SSLm and/or timing for sensing a current generated from the pixel PX through sensing lines SSL1 to SSLm.

The sensing circuit 400 may generate a compensation value that compensates for a characteristic value of the pixels PX based on a sensing value (or sensing current) provided from the sensing lines SSL1 to SSLm. For example, the sensing circuit 400 may detect and compensate for a change in a threshold voltage and a change in mobility of the driving transistor, and a change in the characteristic of the light emitting element included in the pixel PX.

According to some example embodiments, during the sensing period, the sensing circuit 400 may supply a reference voltage (e.g., a set or predetermined reference voltage) Vint to the pixels PX through the sensing lines SSL1 to SSLm, and may receive the current or voltage extracted from the pixel PX. The extracted current or voltage may correspond to a sensing value, and the sensing circuit 400 may detect the change in the characteristic of the driving transistor based on the sensing value. The sensing circuit 400 may calculate a compensation value that compensates for the input image data based on the detected change in the characteristic. The compensation value may be provided to the timing controller 600 or the data driver 300.

During the display period, the sensing circuit 400 may supply a reference voltage (e.g., a set or predetermined reference voltage) Vint to the pixel unit 100 through the sensing lines SSL1 to SSLm. According to some example embodiments, the reference voltage Vint may be provided from the power supply 500 to the sensing circuit 400.

Figure 21:
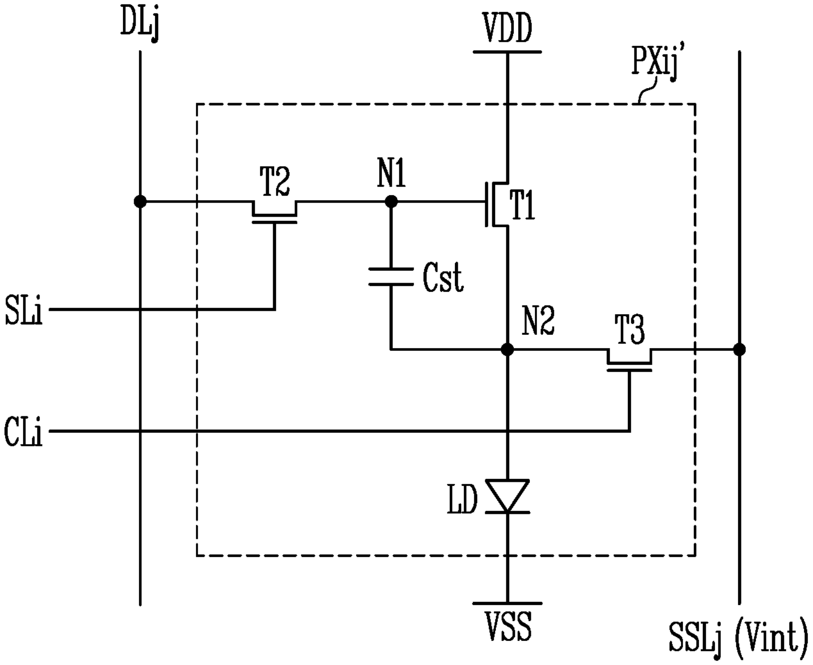
FIG. 21 is a circuit diagram showing an example of a pixel included in a display device of FIG. 20.

FIG. 21 is a circuit diagram showing an example of a pixel included in a display device of FIG. 20.

In FIG. 21, the same reference numerals are used for constituent elements described with reference to FIG. 2, and duplicate description of these constituent elements will be omitted. In addition, the pixel PXij' of FIG. 21 may have a configuration substantially equivalent to or similar to the pixel PXij of FIG. 2 except for the sensing line SSLj connected to the third transistor T3.

Referring to FIG. 21, the pixel PXij' may include a light emitting element LD, a first transistor T1 (or driving transistor), a second transistor T2, a third transistor T3, and a storage capacitor Cst.

The third transistor T3 may be connected between the sensing line SSLj and the second electrode (i.e., second node N2) of the first transistor T1. The gate electrode of the third transistor T3 may be connected to the control line CLi. The third transistor T3 may be turned on when a control signal is supplied to the control line CLi to electrically connect the sensing line SSLj and the second node N2 (i.e., second electrode of the first transistor T1).

The reference voltage Vint may be supplied to the second node N2 through the sensing line SSLj, or the sensing value generated from the second node N2 may be supplied to the sensing circuit 400 (see FIG. 20).

However, this is merely an example, a configuration of the pixel PXij' and the external compensation method may be variously modified.

As described above, the display device to which the black image insertion driving according to some example embodiments of the present invention is applied may change the reference voltage Vint supplied to the pixel according to a difference in the light emitting time of the pixel rows. In addition, the display device may change the image data voltage VDATA corresponding to the same grayscale according to the difference in the light emitting time of the pixel rows. Therefore, the difference in the display luminance between the pixel rows adjacent to each other may be reduced.

In particular, the difference in the display luminance between the last pixel row of the first pixel block and the first pixel row of the second pixel block adjacent to the first pixel block may be minimized or reduced. Therefore, the difference (i.e., perception of boundary) in the perceptible luminance according to the difference in the light emitting time for each pixel row in the display device to which the black image insertion driving is applied, is reduced or minimized, and the display quality may be improved.

While aspects of some example embodiments of the invention are described with reference to the attached drawings, it will be understood by those skilled in the art that various changes in form and details may be made therein without departing from the spirit and scope of embodiments according to the present invention as defined by the appended claims and their equivalents.

What is claimed is:

1. A display device comprising:

a first pixel block including a plurality of pixel rows electrically connected to at least some of a plurality of control lines, each of the plurality of pixel rows including a plurality of pixels, the plurality of pixels being electrically connected to a plurality of data lines;

a second pixel block including a plurality of pixel rows electrically connected to some of remaining control lines of the plurality of control lines, each of the plurality of pixels rows including a plurality of pixels, the plurality of pixels being electrically connected to the plurality of data lines;

a scan driver configured to supply control signals to the plurality of control lines;

a data driver configured to supply data voltages to the plurality of data lines; and a power supply configured to supply a reference voltage to the first pixel block and the second pixel block, wherein, among the plurality of control lines, a control line electrically connected to a last pixel row of the first pixel block and a control line electrically connected to a first pixel row of the second pixel block are adjacent to each other, and wherein the power supply is configured to supply the reference voltage of a first level to the first pixel row of the second pixel block and supply the reference voltage of a second level lower than the first level to the last pixel row of the first pixel block.

2. The display device of claim 1, wherein the at least some of the plurality of control lines are consecutive, and the some of the remaining control lines of the plurality of control lines are consecutive.

3. The display device of claim 1, wherein the power supply is further configured to supply the reference voltage of the first level to a first pixel row of the first pixel block and supply the reference voltage of the second level to a last pixel row of the second pixel block.

4. The display device of claim 1, wherein at least one of the plurality of pixels of the first pixel block and at least one of the plurality of pixels of the second pixel block are electrically connected to a reference power line, and wherein the power supply is configured to supply the reference voltage to the reference power line.

5. The display device of claim 4, wherein the at least one of the plurality of pixels of the first pixel block comprises:

a light emitting element connected between a second node and a second driving power supply;

a first transistor connected between a first driving power supply and the second node, and having a gate electrode connected to a first node;

a second transistor connected between one of the plurality of data lines and the first node;

a third transistor connected between the second node and the reference power line, and having a gate electrode connected to one of the plurality of control lines; and a storage capacitor connected between the first node and the second node.

6. A display device comprising:

a first pixel block including a plurality of pixel rows electrically connected to at least some of a plurality of control lines, each of the plurality of pixel rows including a plurality of pixels, the plurality of pixels being electrically connected to a plurality of data lines;

a second pixel block including a plurality of pixel rows electrically connected to some of remaining control lines of the plurality of control lines, each of the plurality of pixels rows including a plurality of pixels, the plurality of pixels being electrically connected to the plurality of data lines;

a scan driver configured to supply control signals to the plurality of control lines;

a data driver configured to supply data voltages to the plurality of data lines;

a power supply configured to supply a reference voltage to the first pixel block and the second pixel block; and a timing controller configured to control the scan driver, the data driver, and the power supply, wherein, among the plurality of control lines, a control line electrically connected to a last pixel row of the first pixel block and a control line electrically connected to a first pixel row of the second pixel block are adjacent to each other, and wherein the timing controller is further configured to:

control the scan driver to supply a control signal at a turn-on level to the first pixel row of the second pixel block while the power supply outputs the reference voltage of a first level; and control the scan driver to supply the control signal at the turn-on level to the last pixel row of the first pixel block while the power supply outputs the reference voltage of a second level lower than the first level.

7. The display device of claim 6, wherein the timing controller generates a power driving control signal to control a voltage level of the reference voltage and a scan driving control signal to control a timing of the control signal.

* * * * *